United States Patent
Lee

(10) Patent No.: US 10,071,335 B2
(45) Date of Patent: Sep. 11, 2018

(54) OZONIZED BIOCHAR COMPOSITIONS AND METHODS OF MAKING AND USING THE SAME

(71) Applicant: James Weifu Lee, Chesapeake, VA (US)

(72) Inventor: James Weifu Lee, Chesapeake, VA (US)

( * ) Notice: Subject to any disclaimer, the term of this patent is extended or adjusted under 35 U.S.C. 154(b) by 0 days.

(21) Appl. No.: 15/228,611

(22) Filed: Aug. 4, 2016

(65) Prior Publication Data

US 2017/0036983 A1    Feb. 9, 2017

Related U.S. Application Data

(60) Provisional application No. 62/201,870, filed on Aug. 6, 2015.

(51) Int. Cl.

| | |
|---|---|
| *B01D 53/02* | (2006.01) |
| *B01J 39/24* | (2017.01) |
| *B01J 39/02* | (2006.01) |
| *C09C 3/06* | (2006.01) |
| *C09C 1/44* | (2006.01) |
| *C09K 17/14* | (2006.01) |
| *C05F 11/00* | (2006.01) |
| *C02F 1/28* | (2006.01) |

(52) U.S. Cl.
CPC .............. *B01D 53/02* (2013.01); *B01J 39/02* (2013.01); *B01J 39/24* (2013.01); *C02F 1/283* (2013.01); *C05F 11/00* (2013.01); *C09C 1/44* (2013.01); *C09C 3/06* (2013.01); *C09K 17/14* (2013.01); *B01D 2253/102* (2013.01); *Y02E 50/343* (2013.01)

(58) Field of Classification Search
CPC .. B01J 39/24; C02F 1/283; C09C 3/06; C07C 29/48; C07C 51/34
See application file for complete search history.

(56) References Cited

U.S. PATENT DOCUMENTS 9,561,530 B1 * 2/2017 Kinsman ................... B09C 1/08
2011/0172092 A1    7/2011 Lee

FOREIGN PATENT DOCUMENTS

| WO | 2014152291 A1 | 9/2014 |
|---|---|---|
| WO | 2015134349 A1 | 9/2015 |

OTHER PUBLICATIONS

Valdes et al (Langmuir, Effect of Ozone treatment on Surface Properties of Activated Carbon, 2002,18 (6), pp. 2111-2116) (2002).*
International Search Report and Written Opinion of the International Searching Authority, International Application No. PCT/US16/45538, dated Oct. 7, 2016.
Lee, J. W. et al., "Characterization of Biochars Produced from Cornstovers for Soil Amendment", Envrion. Sci. Technol. 44 pp. 7970-7974 (2010).
Rondon et al., "Biological Nitrogen Fixation by Common Beans (*Phaseolus vulgaris* L.) Increases with Bio-Char Additions", Biol. Fertil Soils 43, pp. 699-708 (2007).
Rillig et al., "Material Derived from Hydrohermal Carbonization: Effect on Plant Growth and Arbuscular Mycorrhiza", Applied Soil Ecology 45, pp. 238-242 (2010).
Gundale et al., "Charcoal Effects on soil Solution chemistry and Growth of Koeleria macrantha in the Pondersosa Pine/Douglas-Fir Ecosystem", Biol. Fertil. Soils 43, 303-311 (2007).
Huff et. al., "Comparative analysis of Pinewodd, Peanut shell, and Bamboo Biomass Derived Biochars Produced via Hydrothermal Conversion and Pyrolysis", Journal of Environmental Management 146, 303-308 (2014).
Smith et al., "Molecular characterization of Inhibiting Biochar Water-Extractable Substances Using Electrospray Ionization Fourier Transform Ion Cyclotron Resonance Mass Spectrometry", Environ. Sci. Technol., 47, 13294-13302 (2013).
Smith et al., "Potential Impact of Biochar Water-Extractable substances on Environmental Sustainabilty", ACS Sustainable Chem. eng. 1, 118-126 (2013).

* cited by examiner

*Primary Examiner* — Paul A Zucker

(57) ABSTRACT

Ozonized biochar compositions and methods for creating advanced hydrophilic biochar materials are provided with higher cation exchange capacity, optimized pH, improved wettability, and free of potential toxic components. These ozonized biochar compositions are used as filtration materials, as biochar soil additives and as carbon sequestration agents to help control climate change for energy and environmental sustainability on Earth.

20 Claims, 10 Drawing Sheets

OZONIZED BIOCHAR COMPOSITIONS AND METHODS OF MAKING AND USING THE SAME

CROSS-REFERENCE TO RELATED APPLICATIONS

This application claims priority and benefit from U.S. Provisional Application No. 62/201,870 filed on Aug. 6, 2015, which is incorporated herein by reference in its entirety.

FIELD OF THE INVENTION

The present invention is directed to ozonized biochar compositions and methods for creating advanced hydrophilic biochar materials with higher cation exchange capacity that are also free of potential toxic components for use as filtration materials and as a soil amendment and carbon sequestration agent to help control climate change for energy and environmental sustainability on Earth.

BACKGROUND

Smokeless biomass pyrolysis with utilization of biochar as a soil amendment is a potentially significant approach for renewable energy production and for carbon sequestration at giga tons of carbon (GtC) scales. The central idea is that biochar (FIG. 1, left), if produced cleanly and sustainably by pyrolysis of biomass wastes and used as a soil amendment, would "lock up" biomass carbon in a form that can persist in soils for hundreds to thousands of years; and at the same time, help to retain nutrients in soils and reduce the runoff of agricultural chemicals.

The capacity of carbon sequestration by application of biochar fertilizer in soils could be quite significant since the technology could potentially be applied in many land areas including croplands, grasslands and also a fraction of forest lands. The maximum capacity of carbon sequestration through biochar soil amendment in croplands alone is estimated to be about 428 GtC for the world. This capacity is estimated according to: (a) the maximal amount of biochar carbon that could be cumulatively placed into soil while still beneficial to soil environment and plant growth; and (b) the arable land area that the technology could potentially be applied through biochar agricultural practice.

Globally, each year about 6.6 gigatons (Gt) of dry matter waste biomass (e.g., crop stovers, dead leaves, waste woods, and rice straws) are produced. Deployment of an advanced biomass pyrolysis technology could turn this type of waste into valuable biochar, bio-syngas, and biofuel products in a distributed manner. Worldwide, this approach could result in a net reduction of greenhouse-gas emissions by about 1.8 Gt of $CO_2$—C equivalent emissions per year, which is about 12% of the current global anthropogenic emissions. Advanced biomass pyrolysis coupled with biochar soil amendment is unique among carbon sequestration strategies in that it can simultaneously offset gigatons of $CO_2$ emissions and build sustainability into agricultural systems. This is a unique "carbon-negative" bioenergy system approach, which on a life-cycle basis could not only reduce but also reverse human effects on climate change.

More scientific and technological development is needed before this approach can be considered for widespread commercial implementation. For example, a new generation of high-tech biochar materials with higher cation change capacity to retain soil nutrients is needed to serve as an effective soil amendment and carbon sequestration agent. Furthermore, biochar occasionally shows inhibitory effects on plant growth (Rondon et al., Biol. Fertil. Soils 43:699-708 (2007); Rillig et al., Applied Soil Ecology 45:238-242 (2010); Gundale, Thomas, DeLuca, Biol. Fertil. Soils 43:303-311(2007)). Organic species including possibly inhibitory and benign (or stimulatory) chemicals are produced as part of the biomass pyrolysis process. A number of organic compounds belonging to various chemical classes, including n-alkanoic acids, hydroxyl and acetoxy acids, benzoic acids, diols, triols, and phenols were recently identified in organic solvent extracts of biochar. Some of these biochar chemicals, including polycyclic aromatic hydrocarbons (PAHs), are potentially phytotoxic or biocidal, especially at high concentrations. More recently, using the techniques of electrospray ionization (ESI) coupled to Fourier transform ion cyclotron resonance mass spectrometry (FT-ICR-MS) with Kendrick mass defect analysis, it has also been determined that the most likely biochar toxin species contain carboxyl and hydroxyl homologous series and that the phytotoxicity of biochar substances is most likely due to degraded lignin-like species rich in oxygen containing functionalities, which is also part of the PAHs type of organic molecules (Smith et al., Environ. Sci. Technol. 47:13294-13302 (2013)). In addition, certain PAHs are suspected carcinogens. If biochar were to be globally used as a soil amendment and carbon sequestration agent at GtC scales, the release of potentially toxic compounds into soil and associated hydrologic systems might have unpredictable negative consequences in the environment. Therefore, it is essential to address some of these undesirable effects in order for biochar to be used as a soil amendment and carbon sequestration agent at gigaton scales. Any new technology that could produce an advanced biochar product that has high cation exchange capacity without any undesirable side effects would be highly desirable for this major mission of using biochar soil carbon sequestration to control climate change towards sustainability on Earth. Recently, a novel method of creating carboxylated biochars was disclosed in International Patent Application No. PCT/US2014/027170 for "Carboxylated Biochar Compositions And Methods Of Making And Using The Same", which published as International Patent Application Publication Number: WO2014152291A1.

SUMMARY OF THE INVENTION

Exemplary embodiments are directed to an ozonization-based method employed as a post-production biochar-surface oxygenation process to improve biochar properties. The ozone-enabled biochar surface oxygenation process creates a new generation of advanced hydrophilic and clean biochar materials with higher cation exchange capacity, optimized pH and optimized hydrophilicity, and that are free of undesirable potential toxic components, which represents a significant technological improvement. Exemplary embodiments use a single ozone-enabled biochar surface oxygenation process to achieve at least four improvements in the resulting biochar, i.e., enhanced biochar cation exchange capacity, reduced alkaline biochar pH, improved biochar wettability and destruction of potential biochar toxins, simultaneously. Exemplary embodiments can be practiced in a distributed manner at certain biochar-production facilities, biochar-utilizing farm sites, and other industrial sites to convert tons of conventional biochar materials into advanced hydrophilic biochar products for use as soil amendment and other industrial applications.

According to exemplary embodiments, a method for production of an ozonized biochar composition includes reacting a biochar source with an ozone-containing gas stream in a biochar ozonization treatment reactor system using an ozone-enabled biochar-surface oxygenation operational process. The biochar source is contacted with ozone to (a) enable biochar-surface oxygenation; (b) destruct potential biochar toxins; and (c) produce an ozonized biochar composition having optimal characteristics or an optimal group of characteristics. These characteristics are selected from the group consisting of enhanced cation exchange capacity (CEC), optimal pH value, optimal carboxyl content, optimal hydrophilicity and wettability, optimal water-holding field capacity, optimal oxygen-to-carbon molar ratio, surface area, composition, nutrient contents, biochar particle size, uniformity, and any combination thereof.

Exemplary embodiments are also directed to a method for producing an ozonized biochar material having a higher cation-exchanging property. The cation-exchanging ability of a biochar is known to be predominantly dependent on the density of cation-exchanging groups, mainly carboxyl (—COOH) groups, in the biochar.

In one embodiment, a biochar source is reacted with an injected ozone ($O_3$)-containing stream in a controlled manner such that the biochar source homogeneously acquires carboxy-containing cation-exchanging groups in a post-production biochar-surface oxygenation process that creates carboxyl groups on biochar surfaces even at ambient pressure and temperature. This controlled ozone treatment creates additional oxygen-containing functional groups including, but not limited to, carbonyl (biochar $C=O$), hydroxyl (—OH) and carboxyl (—COOH) groups, improves biochar surface hydrophilicity and CEC and simultaneously destructs potential toxins.

Exemplary embodiments are also directed to biochar ozonization treatment reactor system comprises that includes an air inlet pump or valve, an ozone generator system, an ozone air inlet or tube passing through the biochar ozonization reactor wall near its bottom, an ozone air space at the bottom of the reactor, a porous metal plate, a biochar ozonization reactor chamber space above the porous metal plate, a biochar inlet passing through the biochar ozonization reactor wall at the upper part of the reactor, an ozonized biochar outlet passing through the reactor wall at the lower part of the reactor, a tail gas vent valve and filter at the top of the reactor, a flexible tail gas recycling tube equipped with its filter and valve and pump and valve connecting from the tail gas vent tube to the air inlet, a heat-smoke-sensing sprinkler system passing through the biochar ozonization reactor wall at the upper part of the reactor, and a flexible inlet and outlet valve at the bottom of the reactor.

In one embodiment the biochar ozonization treatment reactor system includes an $O_3/CO_2$ air inlet pump or valve, an ozone generator system, an ozone air inlet or tube passing through the biochar ozonization reactor wall near its bottom, an ozone $O_3/CO_2$ air space at the bottom of the reactor, a W-conical-shaped porous metal plate, a biochar ozonization reactor chamber space above the porous metal plate, a biochar inlet passing through the biochar ozonization reactor wall at the upper part of the reactor, an $O_3/CO_2$ gas flowing from $O_3/CO_2$ air space at the bottom through the W-conical-shaped porous metal plate and the biochar materials toward the upper part of the reactor, an ozonized biochar outlet passing through the reactor wall at the lower part of the reactor, tail gas vent valve and filter at the top of the reactor, a flexible tail gas recycling tube equipped with its filter and valve and pump and valve connecting from the tail gas vent tube to the air inlet, a heat-smoke-sensing sprinkler system equipped with water inlet and water spray system at the upper part of the reactor, an optional water level and flexible water inlet and outlet valve at the bottom of the reactor, a recycling water pump with a flexible water recycling tube connected with the flexible water inlet and outlet at the reactor bottom and the water inlet at the heat-smoke-sensing sprinkler system.

Exemplary embodiments are directed to a double-wall coolant-jacketed ozone gas biochar reactor system having a heat-conducting reactor inner wall, a reactor outer wall, a coolant chamber space formed between the inner wall and outer wall, a coolant inlet connected with the coolant chamber space at the bottom part of the reactor, a hot coolant outlet connected with the coolant chamber space at the top part of the reactor, an $O_3/CO_2$ air inlet pump and valve, an ozone generator system, an ozone air inlet or tube passing through the biochar ozonization reactor wall near its bottom, an ozone $O_3/CO_2$ air space at the bottom of the reactor, an inverted-V conical-shaped porous metal plate, a biochar ozonization reactor chamber space above the porous metal plate, a hot biochar inlet passing through the biochar ozonization reactor wall at the upper part of the reactor, an $O_3/CO_2$ gas flowing from $O_3/CO_2$ air space at the bottom through the conical-shaped porous metal plate and the biochar materials toward the upper part of the reactor, an ozonized biochar outlet passing through the reactor wall at the lower part of the reactor, a tail gas vent valve and filter at the top of the reactor, a flexible tail gas recycling tube equipped with its filter and valve and pump and valve connected from the tail gas vent tube to the air inlet, a heat-smoke-sensing sprinkler system equipped with water inlet and water spray system at the upper part of the reactor, an optional water level and flexible water inlet and outlet valve at the bottom of the reactor.

In one embodiment, the biochar ozonization treatment reactor system is constructed from special ozone-compatible materials selected from the group consisting of stainless steel, titanium, silicone, glass, polytetrafluoroethylene (PTFE), commercially available as Teflon® from Chemours of Wilmington, Del., a perfluoroelastomer polymer commercially available as Chemraz® from Greene Tweed of Kulpsville, Pa., polyether ether ketone (PEEK), polychlorotrifluoroethylene (PCTFE) commercially available as Kel-F® from 3M Corporation of St. Paul, Minn., chlorinated polyvinyl chloride (CPVC), a silicon cast iron, chromium and molybdenum alloy, commercially available as Durachlor-51 from Duriron Company of Dayton, Ohio, filled PTFE gasket material, commercially available as Durlon® 9000 from Gasket Resources Inc. of Downingtown, Pa., a nickel, molybdenum, chromium and iron alloy, commercially available as Hastelloy-C™ from All Metals and Forge Group of Fairfield, N.J. polycarbonate, polyurethane, polyvinylidene difluoride (PVDF), commercially available as Kynar® from Arkema Inc. of King of Prussia, Pa., butyl, a heat- and chemical-resistant ethylene acrylic elastomer, commercially available as Vamac® from E. I. du Pont de Nemours and Company of Wilmington, Del., a synthetic rubber and fluoropolymer elastomer commercially available as Viton® from DuPont Performance Elastomers L.L.C. of Wilmington, Del., ethylene-propylene, a thermoplastic vulcanizate (TPV), commercially available as Santoprene™ from ExxonMobil Chemical of Spring, Tex., flexible polyethylene tubing, commercially available as Flexelene from Eldon James Corporation of Denver, Colo., fluorosilicone, aluminum, copper, and combinations thereof.

Exemplary embodiments are directed to an ozone-enabled biochar-surface oxygenation operational process that is a wet-moisture biochar ozonization treatment operational process that includes the following process steps that may be operated in combination with the use of hydrogen peroxide: a) Loading biochar materials into the reactor through the biochar inlet; b) Monitoring and adjusting (as necessary) biochar temperature; c) Monitoring biochar water content and relative humidity in the reactor, d) Based on the required biochar water content and relative humidity, properly adding water into biochar materials by use of a heat-smoke-sensing sprinkler system with water inlet and water spray system at the upper part of the reactor, and/or introducing at least one of water, steam and water vapor by use of a flexible water inlet and outlet valve and optional water level for vapor and moisture generation at the bottom of the reactor; e) Pumping an oxygen-containing source gas stream such as ambient air oxygen through the ozone generator system to generate ozone; f) Feeding ozone-containing gas stream into the reactor chamber space through the porous metal plate above the ozone air space by controlling the air pump fan speed; g) As necessary, using the flexible inlet and outlet valve at the bottom of the reactor to introduce additional stream or vapor or other gas component(s) of choice into the treating gas stream to manipulate the biochar ozonization process; h) As necessary, using the flexible tail gas recycling tube with its filter and valve and pump and valve to re-use part and/or all of the tail gas for the process; i) Allowing sufficient time for the ozone-containing stream to flow/diffuse through and interact with biochar particles while controlling and monitoring the treatment conditions such as reactor temperature and gas-stream flow rate; j) As necessary, discharging the residual ozonized liquid at the bottom of the reactor through a flexible water inlet and outlet or recycling the residual ozonized liquid stream through a recycling water pump with a flexible water recycling tube connected with the flexible water inlet and outlet and the water inlet to re-use the liquid for the biochar ozonization process; k) Harvesting the ozonized biochar products through the ozonized biochar outlet by use of gravity (with minimal energy cost); and k) repeating steps a) through j) for a plurality of operational cycles to achieve more desirable results.

In one embodiment, the biochar-surface oxygenation and destruction of toxins are accomplished simultaneously by use of an $O_3$-containing gas stream flowing through the biochar ozonization treatment reactor at ambient pressure and temperature with minimal cost.

In another embodiment, the optimized biochar pH value is accomplished through the formation of acidic carboxyl groups at biochar surfaces and by the formation and adsorption of nitrogen oxides/nitric acid during a biochar ozonization process in the presence of $N_2$.

According to yet another embodiment, the ozonized biochar composition has a cation exchange capacity of at least about 200% of that of the untreated biochar and is free of biochar toxins.

Exemplary embodiments are directed to ozonized biochar compositions having a given, exceptional, or optimal set of characteristics, such as enhanced cation exchange capacity, optimal pH value, optimal carboxyl content, optimal hydrophilicity and wettability, optimal water-holding field capacity, optimal oxygen-to-carbon molar ratio, surface area, composition, nutrient contents, biochar particle size, zero toxin content, and/or uniformity in any of these or other characteristics. Exemplary embodiments of methods disclosed herein are suitable for producing these types of advanced hydrophilic biochar products with higher cation exchange capacity and free of potential toxic components, which can be used in many practical applications such as the use of the ozonized biochars as filtration materials and as a biochar soil amendment and carbon sequestration agent.

Advantages of the materials, methods, and devices described herein are set forth herein and may be learned by practice of the aspects described below. Both the foregoing general description and the following detailed description are exemplary and explanatory only and are not restrictive.

DETAILED DESCRIPTION

Described herein are methods for producing ozonized biochar compositions with unique properties for use as soil amendment or soil additives and as filtration materials, for example, for industrial filtration applications. The methods described herein apply a series of ozone-enhanced biochar-surface oxygenation and cleaning processes to create a new generation of clean biochar materials with higher cation exchange capacity. These clean biochar materials are free of undesirable and potentially toxic substances and represent a major technological improvement. The ozonization chemistry and technologies are employed as a post-production biochar-surface oxygenation process to convert biochar compositions to unique ozonized compositions. Various aspects and embodiments of the methods herein are disclosed below.

According to one of the various embodiments, a method for industrial production of an ozonized biochar composition involves reacting a biochar source with an ozone-containing gas stream in a special biochar ozonization treatment reactor system using a specific ozone-enabled biochar-surface oxygenation operational process. The method utilizes a biochar ozonization treatment reactor system, and the biochar ozonization treatment reactor system in combination with the use of hydrogen peroxide. In one embodiment, the biochar source is contacted with ozone to (a) enable biochar-surface oxygenation; (b) destruct a potential biochar toxin; (c) produce an ozonized biochar composition having an optimal set of characteristics selected from the group consisting of enhanced cation exchange capacity, optimal pH value, optimal carboxyl content, optimal hydrophilicity and wettability, optimal water-holding field capacity, optimal oxygen-to-carbon molar ratio, surface area, composition, nutrient contents, biochar particle size, uniformity, and any combination thereof; and (d) produce a special ozonized biochar composition having an enhanced filtration property for removing at least one contaminant from a medium selected from the group consisting of water and air.

One exemplary embodiment is directed to a method for producing an ozonized biochar material possessing a higher cation-exchanging property. The cation-exchanging ability of a biochar is known to be predominantly dependent on the density of cation-exchanging groups mainly carboxyl (—COOH) groups in the biochar.

Figure 1:
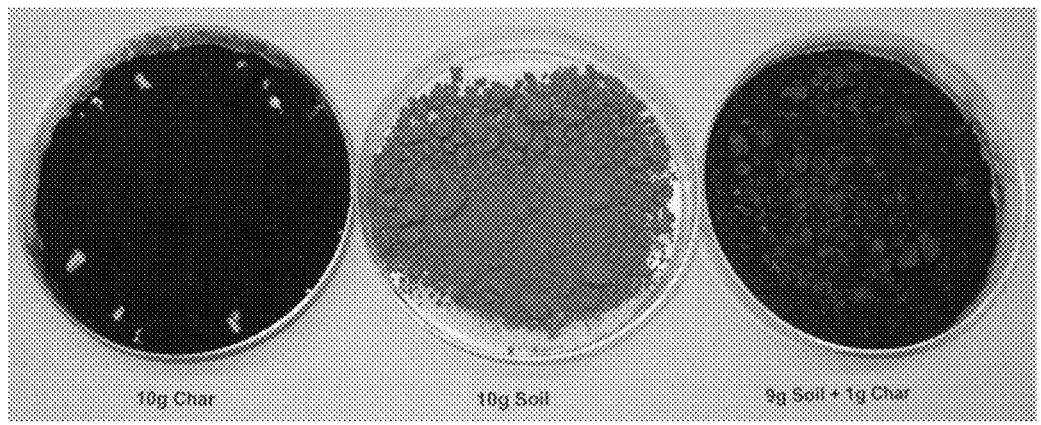
FIG. 1 illustrates, from left to right, 10 g biochar from pyrolysis of cornstover, 10 g soil, and 10 g mixture of biochar (10% W) and soil (90% W). The soil sample is a surface soil from 0-15 cm deep at the University of Tennessee's Research and Education Center, Milan, Tenn., USA (358560N latitude, 888430W longitude), which is also known as the Carbon Sequestration in Terrestrial Ecosystems site (CSiTE) supported by the U.S. Department of Energy.
Figure 2:
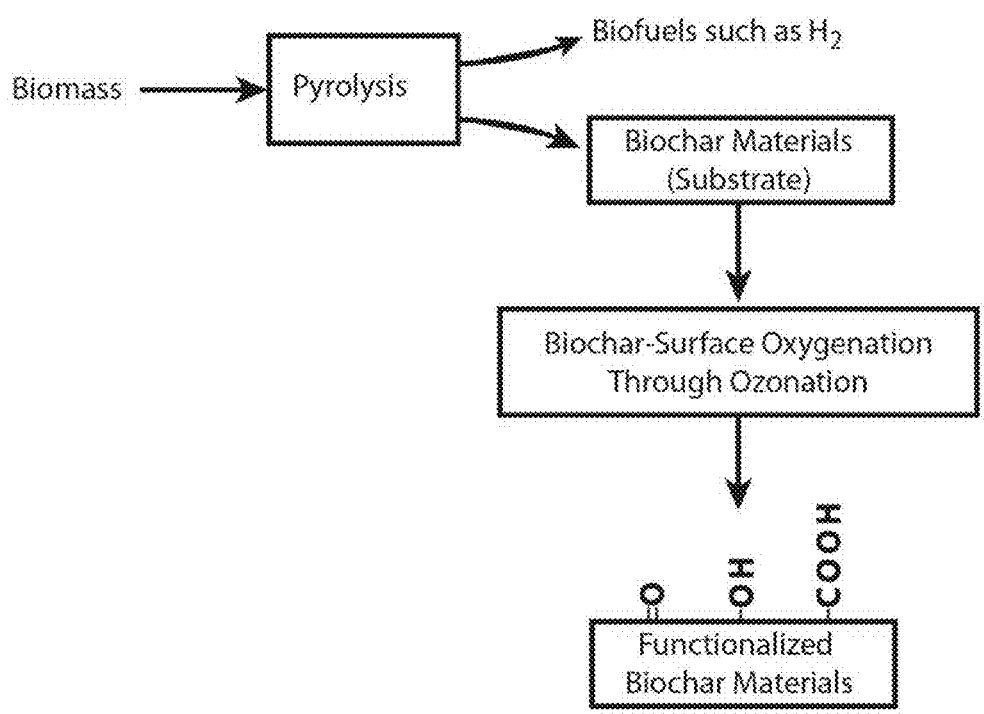
FIG. 2 is a flowchart illustration an embodiment of the application of $CO_2$ injection during biomass pyrolysis for production of biochar materials with higher cation exchange capacity.

Referring to FIG. 2, an exemplary embodiment of a process is illustrated for reacting a biochar source with an injected ozone ($O_3$) stream, which is a ozonizing agent useful herein, in a controlled manner such that the biochar source homogeneously acquires carboxy-containing cation-exchanging groups in a post-production biochar-surface oxygenation process that can create carboxyl groups on biochar surfaces even at ambient pressure and temperature. As shown in FIG. 2, a suitable biomass is subject to a pyrolysis process that results in biofuels such a $H_2$ and biochar materials, i.e., substrate. The process then provides proper utilization of ozone treatment to achieve implantation of oxygen atoms into the biochar materials and thus creating additional oxygen-containing functional groups, such as hydroxyl and carboxyl groups, on the resulting functionalized biochar materials to improve biochar surface hydrophilicity and CEC and to eliminate potential toxins. Therefore, ozonization of biochar creates oxygen-containing functional groups including (but not limited to) carbonyl (biochar C═O), hydroxyl (—OH) and carboxyl (—COOH) groups on the functionalized biochar materials. The carboxyl groups in pH neutral water are mostly deprotonated to form negatively charged species, which may represent the cation binding and exchanging sites on the biochar surfaces.

Figure 3:
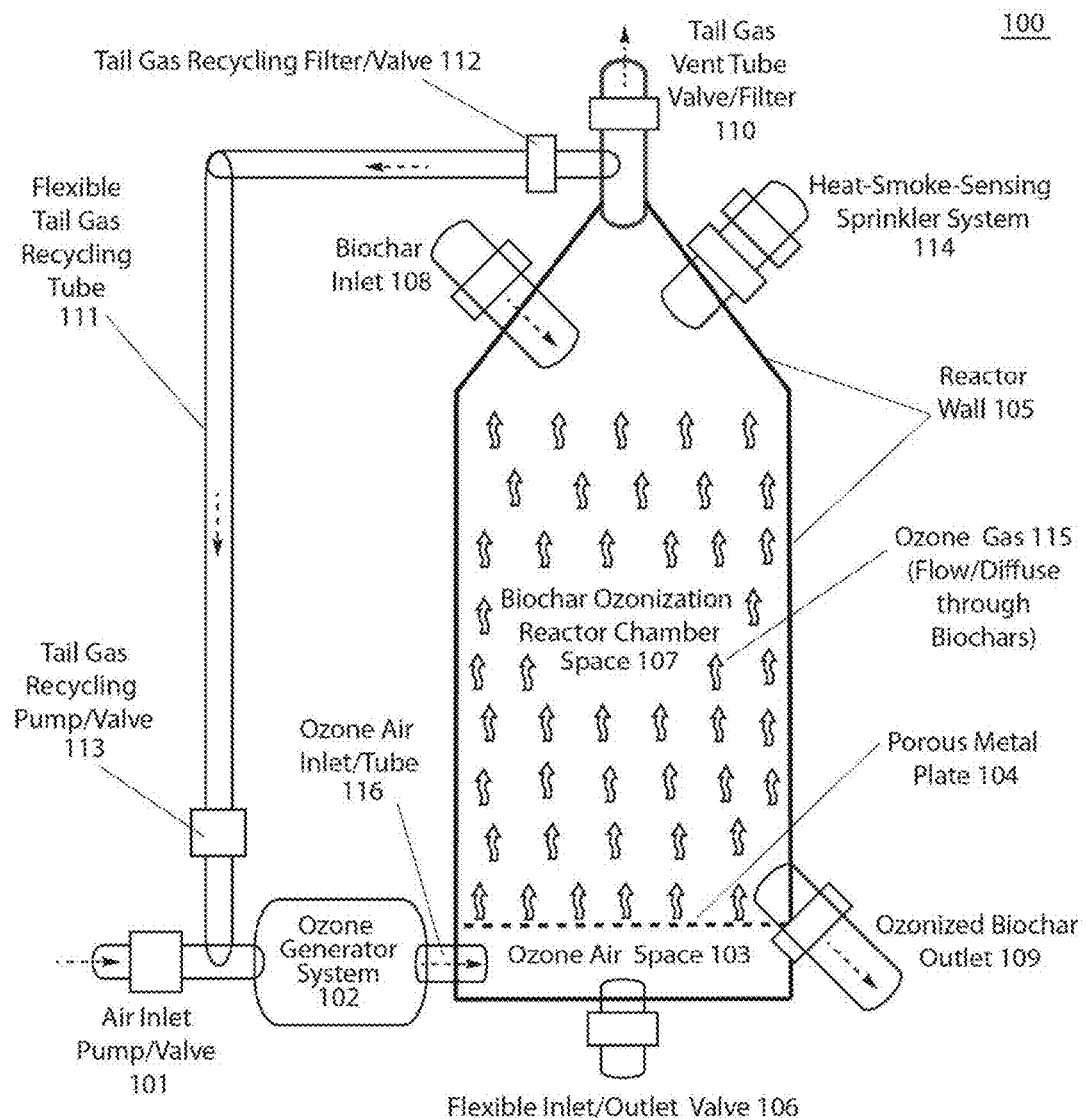
FIG. 3 is a schematic representation of an embodiment of the biochar ozonization treatment reactor system with a flat porous metal plate using an air ozone generator system, a biochar inlet and a heat-smoke-sensing sprinkler system at the upper part of the reactor, flexible tail gas circulating loop, and a biochar outlet at the bottom part of the reactor for harvesting ozonized biochar by use of gravity.

Referring to FIG. 3, in one embodiment, an exemplary embodiment of a biochar ozonization treatment reactor system 100 is illustrated. The biochar ozonization treatment reactor system 100 is a controlled ozone gas biochar reactor system that comprises: an air inlet pump and valve 101, an ozone generator system 102, an ozone air inlet and tube 116 passing through the biochar ozonization reactor wall 105 near its bottom, an ozone air space 103 at the bottom of the reactor, a porous metal plate 104 on top of the ozone air space, a biochar ozonization reactor chamber space 107 above the porous metal plate 104, a biochar inlet 108 passing through the biochar ozonization reactor wall 105 at the upper part of the reactor, an ozonized biochar outlet 109 passing through the reactor wall at the lower part of the reactor, a tail gas vent valve and filter 110 at the top of the reactor, a flexible tail gas recycling tube 111 equipped with its filter and valve 112 and pump and valve 113 connecting from the tail gas vent tube 110 to the air inlet 101, a heat-smoke-sensing sprinkler system 114 passing through the biochar ozonization reactor wall 105 at the upper part of the reactor, and a flexible inlet and outlet valve 106 at the bottom of the reactor.

Ozone is known to crack rubber and certain elastomers that have C═C double bonds. Cast iron, Steel (Mild, High-strength low-alloy (HSLA)), Zinc, Magnesium, Polypropylene and Nylon are also sensitive to ozone corrosion. Those types of ozone-sensitive materials are not recommended for use in building the reactor and associated parts and joints that may be in contact with ozone. It is a preferred practice to use special ozone-compatible materials that can tolerate the reactive ozone in constructing the ozone biochar reactor system including the associated parts and joints that will be in contact with ozone. According to one of the various embodiments, the ozone-compatible materials for use in the construction of the reactor system are selected from the group consisting of stainless steel, titanium, silicone, glass, polytetrafluoroethylene (PTFE), commercially available as Teflon® from Chemours of Wilmington, Del., a perfluoroelastomer polymer commercially available as Chemraz® from Greene Tweed of Kulpsville, Pa., polyether ether ketone (PEEK), polychlorotrifluoroethylene (PCTFE) commercially available as Kel-F® from 3M Corporation of St. Paul, Minn., chlorinated polyvinyl chloride (CPVC), a silicon cast iron, chromium and molybdenum alloy, commercially available as Durachlor-51 from Duriron Company of Dayton, Ohio, filled PTFE gasket material, commercially available as Durlon® 9000 from Gasket Resources Inc. of Downingtown, Pa., a nickel, molybdenum, chromium and iron alloy, commercially available as Hastelloy-C™ from All Metals and Forge Group of Fairfield, N.J., polycarbonate, polyurethane, polyvinylidene difluoride (PVDF), commercially available as Kynar® from Arkema Inc. of King of Prussia, Pa., butyl, a heat- and chemical-resistant ethylene acrylic elastomer, commercially available as Vamac® from E. I. du Pont de Nemours and Company of Wilmington, Del., a synthetic rubber and fluoropolymer elastomer, commercially available as Viton® from DuPont Performance Elastomers L.L.C. of Wilmington, Del., ethylene-propylene, a thermoplastic vulcanizate (TPV), commercially available as Santoprene™ from ExxonMobil Chemical of Spring, Tex., flexible polyethylene tubing, commercially available as Flexelene from Eldon James Corporation of Denver, Colo., fluorosilicone, aluminum, copper, and combinations thereof.

Ozone is an inorganic trioxygen molecule with the chemical formula $O_3$, and is a pale blue gas with a distinctively pungent smell. Suitable methods for ozone generation include, but are not limited to, the corona discharge method, the cold plasma method, ultraviolet light ozone generation, and electrolytic ozone generation.

In on embodiment, an ozone generator utilizing the corona discharge method with a corona discharge tube is employed as the ozone generator system 102 in the biochar ozonization treatment reactor system 100 illustrated in FIG. 3, or in any of the illustrated reactor embodiments utilizing a ozone generator system. The corona discharge tube-based ozone generators are cost-effective and do not require an oxygen source other than the ambient air to produce ozone concentrations of 3-6%. Use of an oxygen concentrator in combination with the corona discharge ozone generator increases the ozone concentrations produced. In addition, the corona discharge tube-based ozone generators also produce nitrogen oxides from the air (21% $O_2$ and 79% $N_2$) as a by-product, which in the presence of water and vapor can form nitric acid that may be absorbed, to some degree, by biochar materials. Certain conventional biochar materials, in particular those made from high-temperature pyrolysis or gasification processes, typically have an alkaline pH ranging from about pH 8.5 up to about pH 12. The adsorption of nitrogen oxides/nitric acid may beneficially reduce the alkaline pH of biochar. To enhance this feature, air (21% $O_2$ and 79% $N_2$) is used through the ozone generator system 102 to create both ozone and nitrogen oxides with moisture to treat dry biochars or wet biochars. When desired, at least one of water and steam is optionally introduced into the biochar ozonization reactor through a flexible inlet and outlet valve 106 at the bottom of the reactor.

Figure 4:
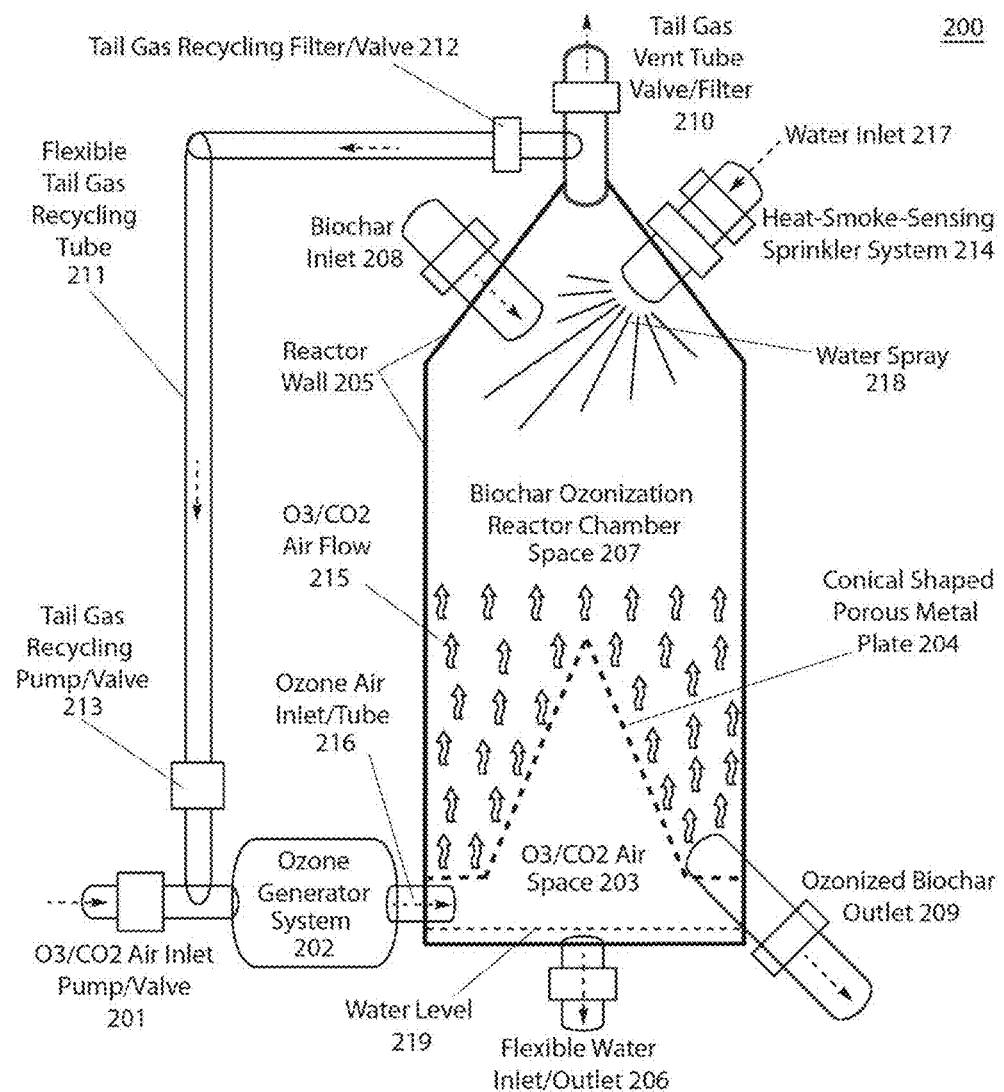
FIG. 4 is a schematic representation of an embodiment of the biochar ozonization treatment reactor system with a conical shaped porous metal plate using an $O_3/CO_2$ air inlet, a flexible tail gas circulating loop, a biochar inlet and a heat-smoke-sensing sprinkler system with water spray at the upper part of the reactor, a flexible water inlet and outlet at the bottom of the reactor, and an biochar outlet at the bottom part of the reactor for harvesting ozonized biochar by use of gravity.

Referring now to FIG. 4, another exemplary embodiment of a biochar ozonization treatment reactor system 200 is illustrated in which water is optionally introduced into the biochar ozonization reactor through a heat-smoke-sensing sprinkler system 214 equipped with water inlet 217 and water spray 218 system at the upper part of the reactor for a "wet biochar" treatment process. In addition to the nitrogen oxides and nitric acid adsorption, the formation of carboxyl groups on biochar surfaces through ozonization also reduces the alkaline biochar pH. Consequently, the air ozonization process results in a nitric nutrient-enriched biochar product with a better pH value more desirable for use as an agricultural soil amendment or additive.

According to one embodiment, when desired, the nitrogen oxides and nitric acid formation and adsorption is reduced by use of an air dryer that reduces or eliminates nitric acid formation by removing water vapor, increasing overall ozone production. Use of an oxygen concentrator further increases the ozone production and further reduces the risk of nitric acid formation by removing not only the water vapor, but also the bulk of the nitrogen. Alternatively, at least one of pure oxygen and a mixed oxygen gas such as $O_2/CO_2$ gas mixtures (that are completely devoid of $N_2$) are used to generate ozone for the biochar treatment process.

According to one embodiment, an ozone generator based on the cold plasma method is utilized as the ozone generator system 102 in the biochar ozonization treatment reactor system 100 illustrated in FIG. 3 or in any illustrated embodiment of the reactor system utilizing an ozone generator system. In the cold plasma method, pure oxygen gas is exposed to a plasma created by dielectric barrier discharge. The diatomic oxygen is split into single atoms, which then recombine in triplets to form ozone. Cold plasma machines utilize pure oxygen as the input source and produce a maximum concentration of about 5% ozone.

According to one embodiment, the regime of applied ozone concentrations ranges from about 1% to about 5% in air and from about 6% to about 14% in oxygen for older generation methods. New electrolytic methods achieve up about 20% to about 30% dissolved ozone concentrations in output water for biochar treatment.

In operating the ozone biochar treatment reactor system process as provided by the reactor embodiments of one or more of FIGS. 3, 4, 5, 6 and 7, biochar materials are loaded through the inlet 108, 208, 308, 408, 508 into the reactor chamber space 107, 207, 307, 407, 507 above the porous metal plate 104, 204, 30, 404, 504 for ozonization treatment. The temperature of biochar materials is monitored and adjusted as necessary or desired. The biochar water content and relative humidity in the reactor are monitored and adjusted as necessary or desired. If or when "wet biochar ozonization" is necessary or desired, water is added into the biochar materials by use of a heat-smoke-sensing sprinkler system 214 with water inlet 217 and water spray 218 system at the upper part of the reactor, or at least one of water and steam is introduced by use of a flexible water inlet and outlet valve 206 and optional water level 2198 at the bottom of the reactor (FIG. 4). Ozone gas is generated from air oxygen through an ozone generator system 102, 202, 302, 402, 502 and fed into the ozone air space 103, 203, 303, 403, 503 at the bottom of the reactor. If or when "dry biochar ozonization" is necessary or desired, a dry treating gas stream is used without any water or steam in the reactor. When ready, the ozone gas 115, 215, 315, 415, 515 stream passing through the porous metal plate 104, 204, 304, 404, 504 flows and diffuses through the biochar materials upwards. As the ozone gas encounters the biochar surfaces during this process, it reacts with certain biochar surface atoms, forming oxygen-containing functional groups on biochar surfaces as illustrated, for example, in FIG. 2.

The most significant reactions of ozone with organic matter are based on the cleavage of the carbon double bond, which acts as a nucleophile having excess electrons. For example, the injected ozone ($O_3$) air stream can, to some extent, lead to the formation of carbonyl and carboxyl groups on biochar surfaces, by reacting with the C═C double bonds (aromatic carbons) of biochar materials at ambient pressure and temperature:

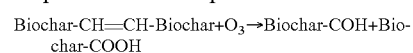

[1]

In this aspect, the ozonized biochar product will: 1) become more hydrophilic since both carbonyl and carboxyl groups can attract water molecules; and 2) have higher cation exchange capacity since the carboxyl groups readily deprotonate in water and result in more negative charge (Biochar-COO⁻) on the ozonized biochar surfaces:

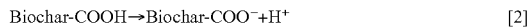

$$\text{Biochar-COOH} \rightarrow \text{Biochar-COO}^- + \text{H}^+ \qquad [2]$$

According to one embodiment, the sources of oxygen gas to generate ozone through the ozone generator system are selected from the group consisting of ambient air oxygen, pure oxygen gas, mixed oxygen and carbon dioxide gas, mixed oxygen and nitrogen gas, residual oxygen-containing flue gas, and combination thereof. Use of pure oxygen gas through the ozone generator can create higher concentration of ozone in the gas stream so that the biochar ozonization reactions are enhanced. Preferably, use of pure oxygen system is limited to well-controlled smaller reactors to ensure operational safety. For better safety and economic considerations, use of ambient air oxygen to generate ozone for biochar ozonization is preferred.

Figure 5:
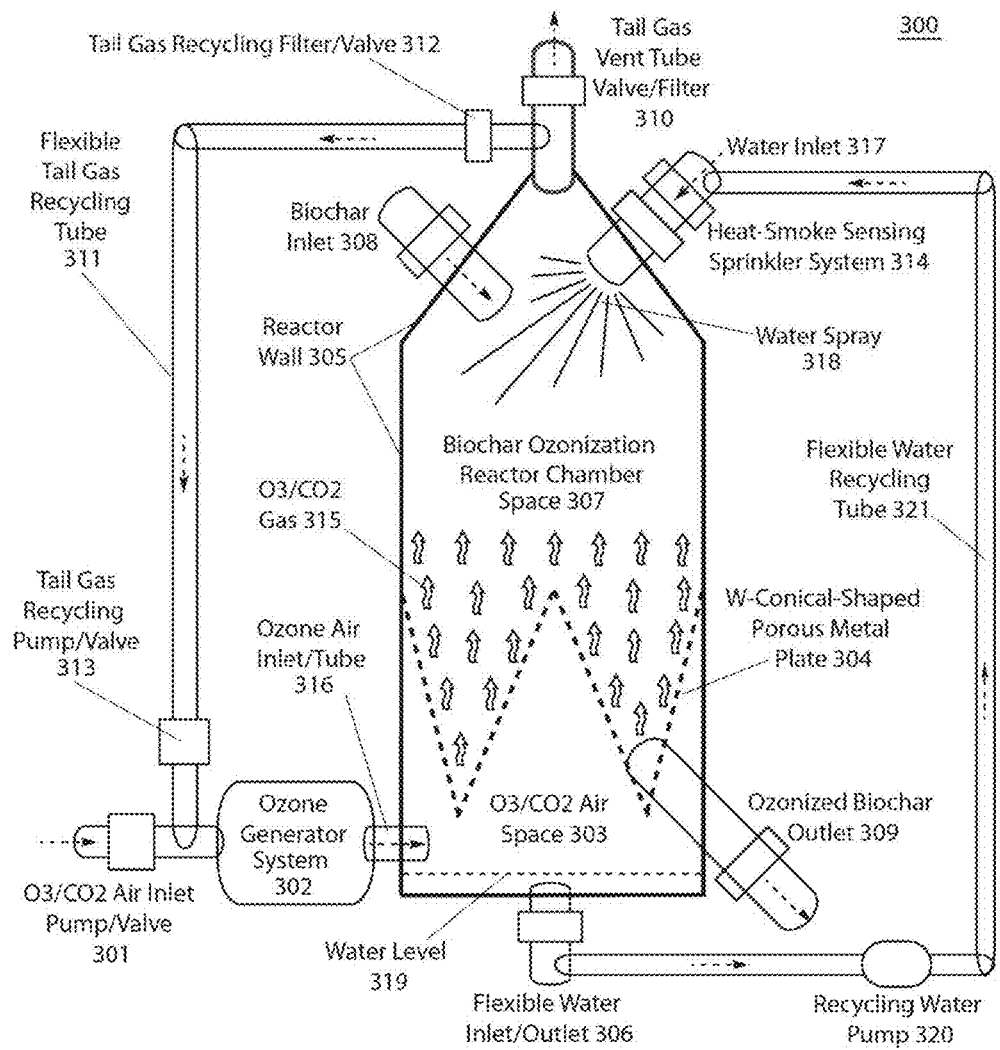
FIG. 5 is a schematic representation of an embodiment of the biochar ozonization treatment reactor system with a W-conical shaped porous metal plate using an $O_3/CO_2$ air inlet, a flexible tail gas circulating loop, a recycling water pump connected from a flexible water inlet and outlet at the bottom of the reactor to a heat-smoke-sensing sprinkler system with water spray at the upper part of the reactor, and an biochar outlet at the bottom part of the reactor for harvesting ozonized biochar by use of gravity.

Biochar can also be quite reactive and can ignite itself; therefore, as shown in FIG. 3, a well-equipped heat-smoke-sensing sprinkler system 114 is utilized to extinguish any potential fire with a water spray within the reactor. Liquid water can be injected into the reactor through the use of a flexible inlet and outlet valve 106 at the bottom of the reactor. When necessary, liquid water can also be discharged from the reactor through the use of the flexible inlet and outlet valve 106 or recycled using a recycling water pump 320 with a flexible water recycling tube 321 connected with the flexible water inlet and outlet 306 and the water inlet 317 to re-use the liquid through water spray 318 as shown in FIG. 5. A potential biochar reactor fire can be stopped also by shutting off any air oxygen supply to the reactor such as by closing the air inlet valve 101 (FIG. 3).

In an experimental study utilizing embodiments of the systems and methods in accordance with the present invention, the biochar ozonization process reactions were somewhat exothermic. Therefore, it is preferred to control the biochar ozonization process speed and heat dissipation so that the temperature of the biochar ozonization reactor can be maintained near the ambient temperature. In one embodiment, the reactor wall is preferably made of metals such as stainless steel that tolerate ozone and dissipate heat as necessary or desired.

According to one embodiment, the biochar ozonization process speed is controlled by adjusting compositions including the ozone concentration and the feeding rate and compositions of the treating gas stream. Use of the flexible inlet and outlet valve 106 at the bottom of the reactor enables the introduction of steam and other gases of choice into the ozone-treating gas stream to achieve a more desirable result. Use of the flexible tail gas recycling tube 111 with its filter and valve 112 and pump and valve 113 provides the option to re-use part or all of the tail gas in the process. For example, when ambient air oxygen (typically containing about 21% $O_2$ and 79% $N_2$) is used to generate ozone for the biochar ozonization process, the tail gas is released through the vent or re-used through the flexible tail gas recycling tube 111 with its filter and valve 112 and pump and valve 113 if the tail gas still contains ozone and/or other gas components that may have a value for re-use. When the biochar is desirably ozonized, the ozonized biochar product is harvested through the use of ozonized biochar outlet 109 at the lower part of the reactor by use of gravity as illustrated in FIG. 3.

Therefore, according to one embodiment, a dry biochar ozonization treatment operational process includes the following specific process steps: a) Loading biochar materials into the reactor through the biochar inlet; b) Monitoring and adjusting (if/when necessary) biochar temperature, c) Monitoring and adjusting (if/when necessary) biochar water content and relative humidity in the reactor, d) Pumping dry oxygen-containing source gas such as ambient air oxygen with an air dryer through the ozone generator system to generate ozone; e) Feeding dry ozone-containing gas stream into the reactor chamber space through the porous metal plate above the ozone air space by controlling the air pump fan speed without using any water; f) If/when necessary, using the flexible inlet and outlet valve at the bottom of the reactor to introduce other gas component(s) of choice into the treating gas stream to manipulate the biochar ozonization process; g) If/when necessary, using the flexible tail gas recycling tube with its filter and valve and pump and valve to re-use part and/or all of the tail gas for the process; h) Allowing sufficient time for the ozone-containing stream to flow/diffuse through and interact with biochar particles while controlling and monitoring the treatment conditions such as reactor temperature and gas-stream flow rate; i) Harvesting the ozonized biochar products through the ozonized biochar outlet by use of gravity (with minimal energy cost); and j) repeating steps a) through i) for a plurality of operational cycles to achieve more desirable results.

Figure 7:
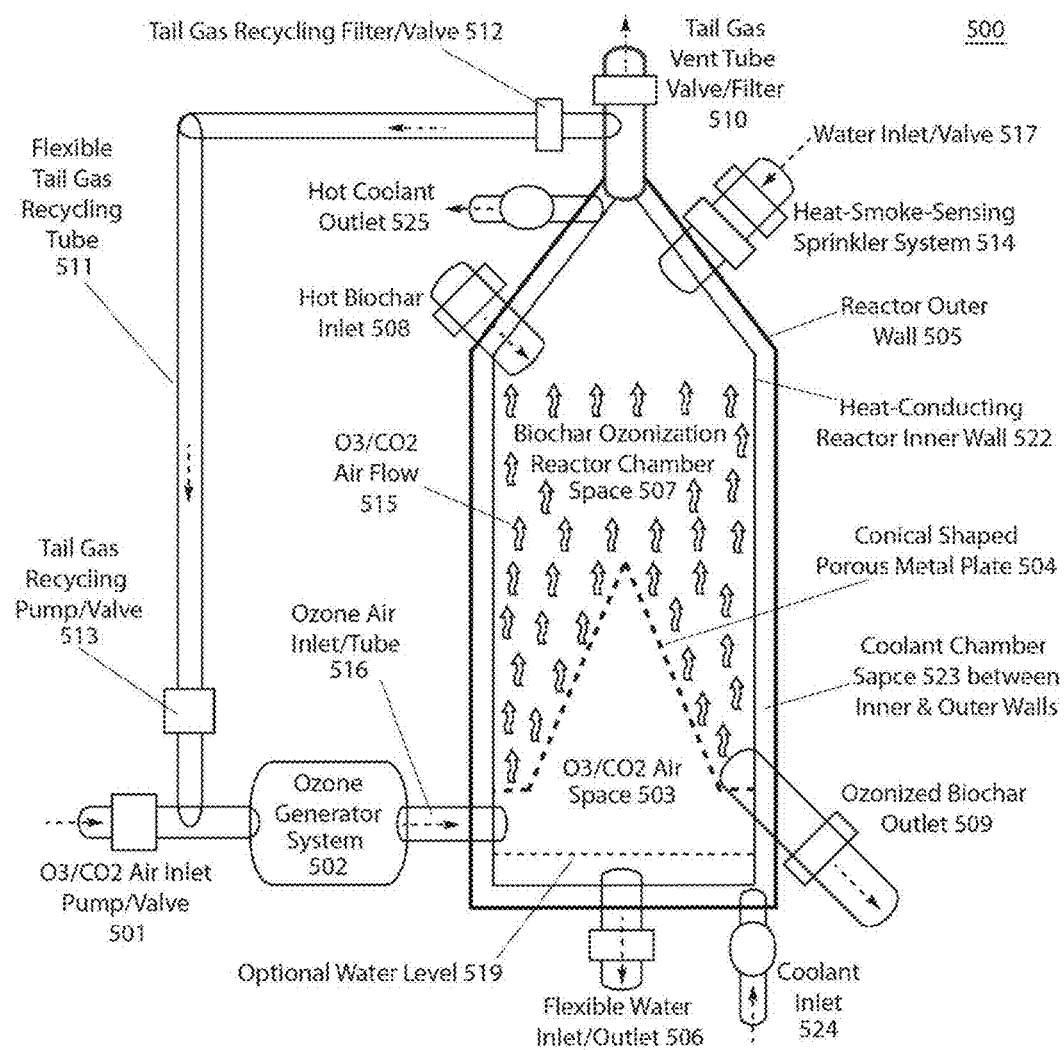
FIG. 7 is a schematic representation of an embodiment of the double-wall-coolant-jacketed biochar ozonization treatment reactor system with coolant inlet and hot coolant outlet, using an inverted-V-conical shaped porous metal plate, an $O_3/CO_2$ air inlet, an ozone generator, a flexible tail gas circulating loop, a flexible water inlet and outlet at the bottom of the reactor, a heat-smoke-sensing sprinkler system and a hot biochar inlet at the upper part of the reactor, and an biochar outlet at the bottom part of the reactor for harvesting ozonized biochar by use of gravity.

In one embodiment, an exemplary processes in accordance with the present invention uses the biochar ozonization treatment process system for a plurality or series of operational cycles to achieve more desirable results. Any one of the steps a) through j) of this process can be adjusted or modified as desired for certain specific operational conditions. For example, as shown in FIG. 7, when a hot biochar source 508 from at least one of a biomass pyrolysis and gasification reactor is used with this treatment process, the biochar temperature monitoring and adjusting step of b) is modified by adding additional steps of using a double-wall coolant-jacketed ozone gas biochar reactor system, 505, 522, 523, 524, 525 with a coolant to cool down hot biochar and to utilize the waste heat energy through a heat exchange system to preheat and/or to dry biomass. Any one of the steps a) through i) of the process of the present invention can be applied in whole or in part and in any adjusted combination for enhanced biochar-surface oxygenation in accordance of this invention.

Referring to FIG. 4, in one embodiment, a biochar ozonization treatment reactor system 200 is illustrated. The biochar ozonization treatment reactor system 200 is a controlled ozone gas biochar reactor system that comprises: an $O_3$ (ozone)/$CO_2$ air inlet pump and valve 201, an ozone generator system 202, an ozone air inlet and tube 216 passing through the biochar ozonization reactor wall 205 near its bottom, an $O_3$/$CO_2$ air space 203 at the bottom of the reactor, a conical-shaped porous metal plate 204, a biochar ozonization reactor chamber space 207 above the porous metal plate 204, a biochar inlet 208 passing through the biochar ozonization reactor wall 205 at the upper part of the reactor, an $O_3$/$CO_2$ air flow 215 from the $O_3$/$CO_2$ air space 203 at the bottom through the conical-shaped porous metal plate and the biochar materials toward the upper part of the reactor, an ozonized biochar outlet 209 passing through the reactor wall at the lower part of the reactor, a tail gas vent valve and filter 210 at the top of the reactor, a flexible tail gas recycling tube 211 equipped with its filter and valve 212 and a pump and valve 213 connecting from the tail gas vent tube 210 to the air inlet 201, a heat-smoke-sensing sprinkler system 214 equipped with water inlet 217 and water spray or atomizer 218 system at the upper part of the reactor, and a flexible water inlet and outlet valve 206 and optional water level 218 at the bottom of the reactor.

This biochar ozonization treatment reactor system 200 illustrated in FIG. 4 is similar to the system illustrated in FIG. 3 with the exception of the following additional features. The embodiment of FIG. 4, employs a conical-shaped porous metal plate 204 that provides more surface area for the ozone containing gas stream to pass through into the biochar ozonization reactor chamber space 207 for better efficiency. In addition, water inlet 217 and water spray 218 are used to optionally add water into the materials to optimize the biochar ozonization process and to prevent any possible biochar fire or combustion. The embodiment of FIG. 4 utilizes an optional water level 219 and flexible water inlet and outlet 206 to provide moisture for the $O_3/CO_2$ air space and to either discharge or to collect and reuse the liquid.

Referring to FIG. 5, another embodiment of a biochar ozonization treatment reactor system 300 is illustrated. The biochar ozonization treatment reactor system 300 is a controlled ozone gas biochar reactor system that includes and $O_3/CO_2$ air inlet pump and valve 301, an ozone generator system 302, an ozone air inlet and tube 316 passing through the biochar ozonization reactor wall 305 near its bottom, an ozone $O_3/CO_2$ air space 303 at the bottom of the reactor, a W-conical-shaped porous metal plate 304, a biochar ozonization reactor chamber space 307 above the porous metal plate 304, a biochar inlet 308 passing through the biochar ozonization reactor wall 305 at the upper part of the reactor, an $O_3/CO_2$ gas 315 flowing from $O_3/CO_2$ air space 303 at the bottom through the W-conical-shaped porous metal plate and the biochar materials toward the upper part of the reactor, an ozonized biochar outlet 309 passing through the reactor wall at the lower part of the reactor, a tail gas vent valve and filter 310 at the top of the reactor, a flexible tail gas recycling tube 311 equipped with its filter and valve 312 and pump and valve 313 connecting from the tail gas vent tube 310 to the air inlet 301, a heat-smoke-sensing sprinkler system 314 equipped with water inlet 317 and water spray 318 system at the upper part of the reactor, an optional water level 319 and flexible water inlet and outlet valve 306 at the bottom of the reactor, a recycling water pump 320 with a flexible water recycling tube 321 connected with the flexible water inlet and outlet 306 and the water inlet 317.

This embodiment of the biochar ozonization treatment reactor system 300 illustrated in FIG. 5 is similar to the embodiment of FIG. 4 with the exception of the following additional features. The embodiment of FIG. 5 employs a W-shaped or a W-conical-shaped porous metal plate 304 that provides even greater surface area for the ozone containing gas stream to pass through into the biochar ozonization reactor chamber space 307 for better efficiency. This embodiment also utilizes a recycling water pump 320 with a flexible water recycling tube 321 connected with the flexible water inlet and outlet 306 and the water inlet 317 to re-use the liquid for the biochar ozonization process.

Figure 6:
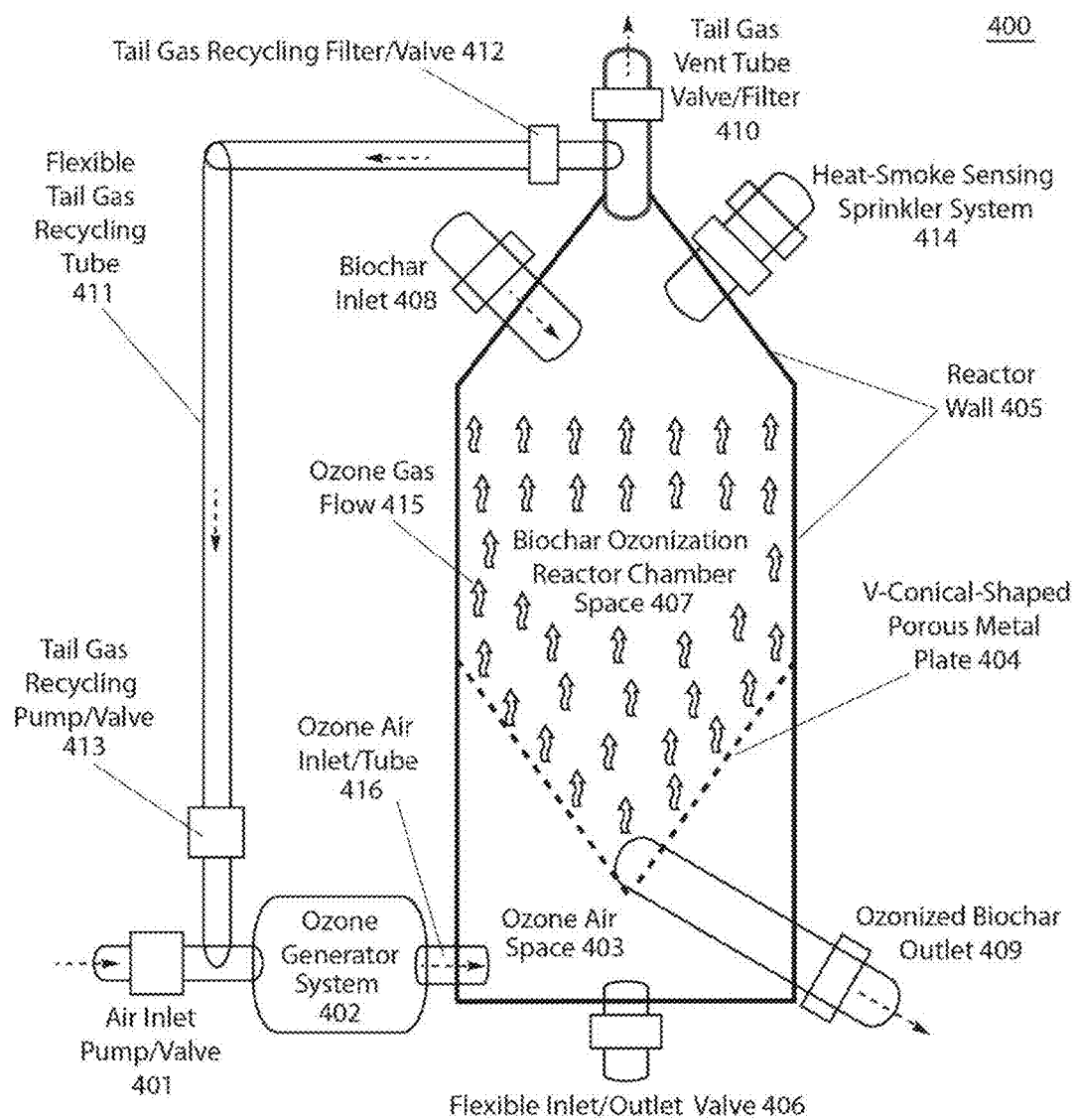
FIG. 6 is a schematic representation of an embodiment of the biochar ozonization treatment reactor system with a V-conical shaped porous metal plate using an air inlet, an ozone generator, a flexible tail gas circulating loop, a flexible inlet and outlet at the bottom of the reactor, a heat-smoke-sensing sprinkler system and a biochar inlet at the upper part of the reactor, and an biochar outlet at the bottom part of the reactor for harvesting ozonized biochar by use of gravity.

Referring to FIG. 6, another embodiment of a biochar ozonization treatment reactor system 400 is illustrated. This embodiment of the biochar ozonization treatment reactor system 400 is a controlled ozone gas biochar reactor system that includes an air inlet pump and valve 401, an ozone generator system 402, an ozone air inlet and tube 416 passing through the biochar ozonization reactor wall 405 near its bottom, an ozone air space 403 at the bottom of the reactor, a V-shaped or V-conical-shaped porous metal plate 404, a biochar ozonization reactor chamber space 407 above the porous metal plate 404, a biochar inlet 408 passing through the biochar ozonization reactor wall 405 at the upper part of the reactor, an ozone gas 415 flowing from ozone air space 403 at the bottom through the V-conical-shaped porous metal plate and the biochar materials toward the upper part of the reactor, an ozonized biochar outlet 409 passing through the reactor wall at the lower part of the reactor, a tail gas vent valve and filter 410 at the top of the reactor, a flexible tail gas recycling tube 411 equipped with its filter and valve 412 and pump and valve 413 connecting from the tail gas vent tube 410 to the $O_3/CO_2$ air inlet 401, a heat-smoke-sensing sprinkler system 414 at the upper part of the reactor, and a flexible inlet and outlet valve 406 at the bottom of the reactor.

The embodiment of the biochar ozonization treatment reactor system 400 illustrated in FIG. 6 is similar to the embodiment illustrated in FIG. 3. However, this embodiment utilizes a V-conical-shaped porous metal plate 404 that provides greater surface area for the ozone containing gas stream to pass through into the biochar ozonization reactor chamber space 407. This shaped of the porous metal plate also provides for a convenient and improved harvest of the treated biochar products through the ozonized biochar outlet 409 by use of gravity with minimal energy consumption.

Referring to FIG. 7, another embodiment of a biochar ozonization treatment reactor system 500 is illustrated. This embodiment of the biochar ozonization treatment reactor system 500 is a double-wall coolant-jacketed ozone gas biochar reactor system that includes a heat-conducting reactor inner wall 522, a reactor outer wall 505, a coolant chamber space 523 formed between the inner wall 522 and outer wall 505, a coolant inlet 524 connected with the coolant chamber space at the bottom part of the reactor, a hot coolant outlet 525 connected with the coolant chamber space at the top part of the reactor, an $O_3/CO_2$ air inlet pump and valve 501, an ozone generator system 552, an ozone air inlet and tube 516 passing through the biochar ozonization reactor outer wall 505 and inner wall 522 near its bottom, an ozone $O_3/CO_2$ air space 503 at the bottom of the reactor, an inverted-V conical-shaped porous metal plate 504, a biochar ozonization reactor chamber space 507 above the porous metal plate 504, a hot biochar inlet 508 passing through the biochar ozonization reactor double walls at the upper part of the reactor, an $O_3/CO_2$ gas 515 flowing from the $O_3/CO_2$ air space 503 at the bottom through the conical-shaped porous metal plate and the biochar materials toward the upper part of the reactor, an ozonized biochar outlet 509 passing through the reactor double walls at the lower part of the reactor, a tail gas vent valve and filter 510 at the top of the reactor, a flexible tail gas recycling tube 511 equipped with its filter and valve 512 and pump and valve 513 connected from the tail gas vent tube 510 to the air inlet 501, a heat-smoke-sensing sprinkler system 514 equipped with a water inlet 517 and a water spray system at the upper part of the reactor, an optional water level 519 and a flexible water inlet and outlet valve 506 at the bottom of the reactor.

The embodiment of the biochar ozonization treatment reactor system 500 of FIG. 7 is similar to the embodiment illustrated in FIG. 6, with the following additional features. The embodiment of FIG. 7 employs a double-wall coolant-jacketed ozone gas biochar reactor system to enable cooling of hot biochar by use of a coolant and the outputting of hot coolant for waste heat energy recovery and utilization such as the utilization of waste heat through a heat exchange system to preheat or to dry biomass. This embodiment also utilizes an inverted-V-conical-shaped porous metal plate 504 that facilitates cooling of the biochar materials within the double-wall coolant-jacketed reactor. In addition, this embodiment utilizes well-controlled $O_3$ concentration levels under a $CO_2$ (and/or $N_2$) atmosphere to prevent any possible biochar combustion especially during the loading of hot biochars from a biomass pyrolysis or gasification reactor.

The coolant utilized in this embodiment is a fluid that flows through or around a biochar reactor to prevent its overheating, transferring the heat produced by the biochar reactor to other devices that utilize the waste heat to pre-heat or dry biomass or to dissipate the heat. Suitable coolants have a high thermal capacity, low viscosity and are low-cost. In addition, the coolants are preferably non-toxic and chemically inert, neither causing nor promoting corrosion of the cooling system. Suitable coolants are selected from the group consisting of water, antifreeze liquid, polyalkylene glycol, oils, mineral oils, silicone oils such as polydimethylsiloxane, fluorocarbon oils, transformer (insulating) oil, refrigerants, and combination thereof.

Figure 8:
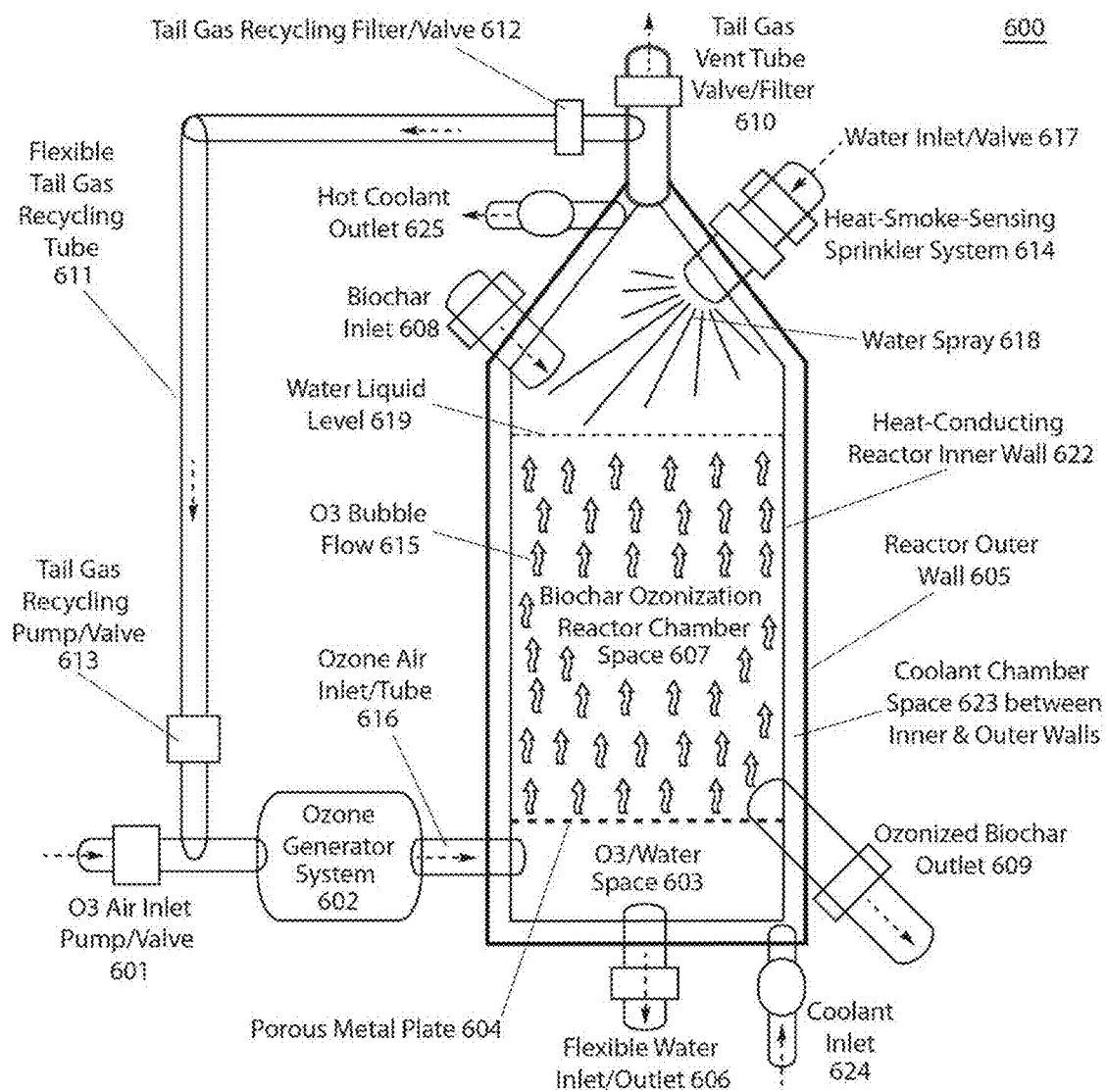
FIG. 8 is a schematic representation of an embodiment of the double-wall-coolant-jacketed biochar liquid-ozonization treatment reactor system with coolant inlet and hot coolant outlet, using a flat porous metal plate, a water liquid fully immersing biochar material at the upper part of the reactor, an $O_3$ air inlet, an ozone generator, a flexible tail gas circulating loop, a $O_3$/water space and a flexible water inlet and outlet at the bottom of the reactor, a heat-smoke-sensing sprinkler system and a hot biochar inlet at the upper part of the reactor, and an biochar outlet at the bottom part of the reactor for harvesting ozonized biochar by use of gravity.

Referring to FIG. 8, another embodiment of a biochar liquid-ozonization treatment reactor system 600 is illustrated. This embodiment of a biochar ozonization treatment reactor system 600 is a double-wall coolant-jacketed ozone gas biochar reactor system that includes a heat-conducting reactor inner wall 622, a reactor outer wall 605, a coolant chamber space 623 formed between the inner wall 622 and outer wall 605, a coolant inlet 624 connected with the coolant chamber space at the bottom part of the reactor, a hot coolant outlet 625 connected with the coolant chamber space at the top part of the reactor, an $O_3$ air inlet pump and valve 601, an ozone generator system 652, an ozone air inlet and tube 616 passing through the biochar ozonization reactor out wall 605 and inner wall 622 near its bottom, an ozone $O_3$/water space 603 at the bottom of the reactor, a porous metal plate 604, a biochar ozonization reactor chamber space 607 above the porous metal plate 604, a biochar inlet 508 passing through the biochar ozonization reactor double walls at the upper part of the reactor, an $O_3$ bubble 615 flowing from the $O_3$/water space 603 at the bottom through the porous metal plate and the biochar materials toward the upper part of the reactor, a tail gas vent valve and filter 610 at the top of the reactor, a flexible tail gas recycling tube 611 equipped with its filter and valve 612 and a pump and valve 613 connected from the tail gas vent tube 610 to the air inlet 601, a heat-smoke-sensing sprinkler system 614 equipped with water inlet 617 and water spray 618 system, a water liquid level 619 at the upper part of the reactor, an ozonized biochar outlet 609 passing through the reactor double walls at the lower part of the reactor, and a flexible water inlet and outlet valve 606 at the bottom of the reactor.

The biochar ozonization treatment reactor system 600 embodiment of FIG. 8 is similar to the embodiment illustrated in FIG. 7 with the following additional features. The embodiment of FIG. 8 uses a water liquid level 619 that completely immerses biochar materials, and this embodiment takes the advantage of a flat porous metal plate 604 that holds biochar materials and allows $O_3$ gas to bubble through.

In another embodiment, the feeding of an $O_3$-containing gas stream is performed preferably with nearly 30% or above 1% of $O_3$ under a pressure of from about 1 to about 30 atmospheres (atm). The $O_3$-containing gas stream can be an $O_3$/water steam stream, an $O_3$—$CO_2$/water steam stream, an $O_3$—$O_2$—$CO_2$/water steam stream, an $O_3$—$O_2$—$CO_2$—$N_2$/water steam stream, an artificial gas mixture stream including an $O_3$—$CO_2$ mixture, an oxygen ($O_2$)-ozone ($O_3$) mixture, an $O_3$—$O_2$—$CO_2$ mixture, an $O_3$-nitrogen ($N_2$) mixture, an $O_3$—$O_2$—$CO_2$—$N_2$ mixture, an $O_3$—$CO_2$—$N_2$ mixture, an $O_3$-argon mixture, an $O_3$-helium mixture, and any combination thereof. According to one embodiment, one of the $O_3$-containing gas streams listed above is selectively applied in combination with a liquid water spray 218 (FIG. 4) into biochar materials to perform "wet biochar ozonization" to achieve more desirable results. Liquid water mediates the biochar ozonization process in a number of ways, for example, by extracting water-soluble biochar substances including the dissolvable organic content (DOC) that may contain the potential phytotoxins to react with the ozone (see equation [3] below) in the liquid phase to make the biochar product cleaner. The residual ozonized liquid may be discharged at the bottom of the reactor through the flexible water inlet and outlet 206. Alternatively, the residual ozonized liquid stream is recycled through the use of a recycling water pump 320 with a flexible water recycling tube 321 connected with the flexible water inlet and outlet 306 and the water inlet 317 to re-use the liquid for the biochar ozonization process as illustrated, for example, in FIG. 5.

According to one embodiment, a wet-moisture biochar ozonization treatment operational process includes the following process steps that are performed in combination with the use of hydrogen peroxide: a) Loading biochar materials into the reactor through the biochar inlet; b) Monitoring and adjusting (if/when necessary) biochar temperature; c) Monitoring biochar water content and relative humidity in the reactor, d) Based on the required biochar water content and relative humidity, properly adding water into the biochar materials by use of a heat-smoke-sensing sprinkler system with water inlet and water spray system at the upper part of the reactor, and/or introducing water and/or steam/vapor by use of a flexible water inlet and outlet valve and optional water level for vapor/moisture generation at the bottom of the reactor (FIG. 5); e) Pumping an oxygen-containing source gas stream such as ambient air oxygen through the ozone generator system to generate ozone; f) Feeding ozone-containing gas stream into the reactor chamber space through the porous metal plate above the ozone air space by controlling the air pump fan speed; g) If/when necessary, using the flexible inlet and outlet valve at the bottom of the reactor to introduce additional stream/vapor and/or other gas component(s) of choice into the treating gas stream to manipulate the biochar ozonization process; h) If/when necessary, using the flexible tail gas recycling tube with its filter and valve and pump and valve to re-use at least part or all of the tail gas for the process; i) Allowing sufficient time for the ozone-containing stream to flow and to diffuse through and interact with biochar particles while controlling and monitoring the treatment conditions such as reactor temperature and gas-stream flow rate; i) If/when necessary, discharging the residual ozonized liquid at the bottom of the reactor through a flexible water inlet and outlet or recycling the residual ozonized liquid stream through a recycling water pump with a flexible water recycling tube connected with the flexible water inlet and outlet and the water inlet to re-use the liquid for the biochar ozonization process as illustrated in, for example, FIG. 5; j) Harvesting the ozonized biochar products through the ozonized biochar outlet by use of gravity (with minimal energy cost); and k) repeating steps a) through j) for a plurality of operational cycles to achieve more desirable results.

In one embodiment, an exemplary process in accordance with the present invention uses the wet biochar ozonization treatment process system for a plurality or series of operational cycles to achieve more desirable results. Any one of the steps a) through k) of the processes as described herein can be adjusted or modified as desired for certain specific operational conditions. For example, as shown in FIG. 7, when a hot biochar source from a biomass pyrolysis and/or gasification reactor is used with this treatment process, the biochar temperature monitoring and adjusting step of b) is modified by adding additional steps of using a double-wall coolant-jacketed ozone gas biochar reactor system with a coolant to cool down hot biochar and to utilize the waste heat energy through a heat exchange system to preheat and/or to dry biomass. Any one of the steps a) through k) of the embodiments of process of the present invention are described herein can be applied in whole or in part and in any adjusted combination for enhanced biochar-surface oxygenation in accordance of this invention.

According to one of the various embodiments, the biochar ozonization treatment process is operated in combination with the use of hydrogen peroxide ($H_2O_2$). Suitable overall amounts of hydrogen peroxide include, but are not limited to, about 1, 3, 10, 20, and 30% w/w treatments of $H_2O_2$ with or without the use of ozone. Typically, biochar treated with $H_2O_2$ show an increase in CEC. This increase in CEC is attributed to an increase in the presence of acidic oxygen functional groups on the surface of the biochar materials. Furthermore, $H_2O_2$ treatment causes an overall drop in biochar's capacity for the removal of methylene blue from solution, likely resulting from the weakening of π-π dispersive forces brought about by the introduction of oxygen functionality, which disrupts the overall aromatic structure of the biochar sample. The use of hydrogen peroxide ($H_2O_2$) is beneficial especially in combination with the wet biochar ozonization reactor process as illustrated, for example, in FIG. 8.

According to one embodiment, the wet biochar ozonization treatment process is operated with biochar completely immersed in liquid water as shown, for example, in FIG. 8. An ozone-treating gas stream, for example, O3/air, is bubbled from the bottom of the reactor through the biochar materials. The presence of excess liquid water allows the biochar particles to move up and down as the bubbling ozone-treating gas stream passes through them, which effectively extracts any water soluble substances such as biochar toxins, other dissolved organic compounds (DOC), and ash salt. Some of the $O_3$ gas can dissolve into the liquid water where it can destruct DOC including the potential biochar toxins while oxygenating the surfaces of biochar particles. As shown, for example, in FIG. 8, the water liquid is discharged through the flexible water inlet and outlet 606 and replenished through a water spray 618 at the upper part of the reactor for continued ozonization and cleaning of the biochar materials until the desired results are achieved. Therefore, use of this biochar liquid ozonization treatment process creates an ultraclean ozonized specialty biochar product used for special industrial applications such as making air and water filters to clean air and water. Suitable applications for these filters include, for are not limited to, home applications, office action and industrial applications in addition to biochar soil applications.

The feeding of an $O_3$-containing gas stream either with or without the use of water spray as shown, for example, in FIGS. 4, 5 and 6 is performed in either a continuous or a pulsed mode to optimize the operation effects when desirable. In another embodiment, the $O_3$-containing gas stream cleans the biochar materials so that small organic molecules (typically at a molecular mass of about 500 Dalton or smaller) are removed from the biochar products by ozone's reactions with the small aromatic organic molecules. It was recently identified in Smith, Buzan, Lee 2013 ACS Sustainable Chem. Eng. 2013, 1, 118-126 that a certain biochar phytotoxic effect is due to types of small organic molecules including certain polycyclic aromatic hydrocarbons (PAHs) at a molecular mass of about 500 Dalton (Da) or smaller that are co-produced during biomass pyrolysis. The potential biochar toxins are typically soluble organic matter that include residual pyrolysis bio-oils, small organic molecules at a molecular mass of about 500 Dalton (Da) or smaller that are co-produced during biomass pyrolysis, polycyclic aromatic hydrocarbons, degraded lignin-like species rich in oxygen containing functionalities, phenolic type of phytotoxins that are now known to contain at least one carboxyl group per toxin molecule, and combinations thereof.

According to one embodiment, the ozone ($O_3$) treatment destructs potential biochar toxins by selectively attacking their C=C double bounds such as the double bonds in phenolic-type and/or polycyclic aromatic hydrocarbons (R—CH=CH—R) as shown in the following process reaction.

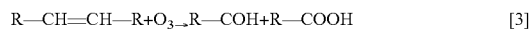

$$R—CH=CH—R+O_3 \rightarrow R—COH+R—COOH \quad [3]$$

In this example, the potential biochar toxins (R—CH=CH—R) are destructed by the ozonization reaction, forming R—COH and R—COOH species, which are typically benign. Therefore, the biochar ozonization treatment also cleans the biochar products by targeted destruction of potential biochar toxins that contain C=C double bonds, in addition to enhancing biochar-surface oxygenation for better hydrophilicity and cation exchange capacity value. Therefore, the post-production biochar surface-oxygenation-treatment process with ozone can be used, as shown, for example, in FIG. 6, to convert tons of conventional biochar materials currently available in the market quickly to clean hydrophilic products free of biochar toxin or with minimized potential biochar toxins. As used herein, "free of biochar toxin" means that the content of the potential biochar toxin (if any) is reduced to such a lower level to eliminate any toxic effect to algal culture growth when tested with a standard concentration of biochar water-extracted substances measured as 0.189 grams of dissolved organic carbon (DOC) per liter.

In contrast to the highly uncontrolled biochar production processes known in the art, exemplary embodiments of systems and methods produces a substantially uniform (i.e., substantially homogeneous) surface-oxygenated biochar. By being "substantially uniform", the resulting biochar contains an absence of regions of non-oxygenated biochar (as commonly found in biochar material formed under uncontrolled conditions, such as in open pits) in the surface-oxygenated biochar. Preferably, a substantially uniform surface-oxygenated biochar possesses different macroscopic regions, e.g., of at least about 100 µm², 1 mm², 10 mm², or 1 cm² in size, that vary by no more than about 10%, 5%, 2%, 1%, 0.5%, or 0.1% in at least one characteristic, such as CEC, oxygen to carbon molar ratio, and surface area. The substantial uniformity of the surface-oxygenated biochar advantageously provides a user with a biochar material that provides a consistent result when distributed into soil, either packaged or in the ground. Furthermore, a substantial uniformity of the surface-oxygenated biochar ensures that a tested characteristic of the biochar is indicative of the entire batch of biochar.

In one embodiment, a substantially uniform biochar is obtained by an effective level of mixing of the biochar during the surface-oxygenation process. For example, in one embodiment, the biochar is agitated, shaken, or stirred either manually or mechanically during the ozonization and purging process. In another embodiment, the biochar is reacted with ozone in a reactor containing a tumbling mechanism such that the biochar is tumbled during the ozonization reaction.

Suitable biochar sources for use in embodiments of the systems and methods described herein include any biochar material that could benefit by the ozonization process of the inventive method. The biochar source could be, for example, a byproduct of a pyrolysis or gasification process, a material acquired from a biochar deposit and natural coal materials, for example, from coal mines. In one embodiment, the biochar is plant-derived, i.e., derived from cellulosic biomass or vegetation. Suitable biomass materials include, but are not limited to, cornstover, e.g., the leaves, husks, stalks, or cobs of corn plants, grasses, e.g., switchgrass, miscanthus, wheat straw, rice straw, barley straw, alfalfa, bamboo and hemp, sugarcane, hull or shell material, e.g., peanut, rice, and walnut hulls, any woody biomasses including dead trees such as dead pine and dead oak, Douglas fir, woodchips, saw dust, waste cardboard, paper or wood pulp, algae, aquatic plants, food waste, spent mushroom substrate, chicken litters, heifer and cow manure, horse manure, pig manure, agricultural waste, and forest waste. In one embodiment, the biomass material is in its native form, i.e., unmodified except for natural degradation processes, before being converted to biochar. In another embodiment, the biomass material is modified by, for example, adulteration with a non-biomass material, e.g., plastic- or rubber-based materials, or by physical modification, e.g., mashing, grinding, compacting, blending, heating, steaming, bleaching, nitrogenating, oxygenating, or sulfurating, before being converted to biochar.

The one or more surface-oxygenation agents considered herein are ozone and ozone-related compounds or materials known in the art that tend to be reactive by imparting oxygen-containing functional groups into organic materials (excluding any of the $O_2$ plasma, $CO_2$ plasma, and CO plasma that have been disclosed before). An example of a surface-oxygenating agent is $O_3$ in the gas form in addition to the $O_3$/water vapor stream, $O_3$/water liquid, $O_3$/water liquid-peroxide ($H_2O_2$), and $O_3$/carbonated water liquid form. As mentioned before, the $O_3$ gas may also be in the form of an artificial gas mixture, such as an $O_3$-oxygen ($O_2$)-carbon dioxide ($CO_2$), $O_3$—$CO_2$, $O_3$—$CO_2$-peroxide ($H_2O_2$), $O_3$—$CO_2$—CO (carbon monoxide), $O_3$—$O_2$-nitrogen ($N_2$), $O_3$—$O_2$—$CO_2$-argon, $O_3$—$O_2$—$CO_2$-helium, or $O_3$—$O_2$—$CO_2$—CO mixture. An artificial gas mixture can be advantageous for the purposes of the invention in that the level of $O_3$ can be precisely controlled, thereby further controlling the pyrolysis and ozonization reactions to optimize the density and kind of oxygen-containing functional groups in the biochar. For example, in different embodiments, it may be preferred to use an $O_3$—$CO_2$-containing gas mixture having at least, less than, or about, for example, 0.1%, 0.5%, 1%, 2%, 3%, 5%, 7%, 10%, 15%, 20%, 30%, 40%, 50%, 60%, 70%, 75%, 80%, 85%, 90%, 95%, or 99% by the volume of $O_3$, or a range bounded by any two of the foregoing values.

In another embodiment, the biochar source can be treated with $O_3$ for "oxygen-implantation" onto the surfaces of the biochar materials as shown in Equation 1 above. The $O_3$ treatment increases the O:C molar ratios or carboxyl groups at biochar surfaces. The cation exchange capacity increases with the O:C ratio of the biochar materials. Accordingly, use of $O_3$ treatment can enable molecular re-engineering of biochar materials to impart unique surface properties such as the cation exchange capacity, without affecting the bulk properties of the biochar.

Preferably, the $O_3$ treatment is conducted at low or ambient temperature, e.g., from about 15° C. to about 30° C. The $O_3$ treatment process entails subjecting the biochar at ambient pressure to a source of $O_3$-containing gas or liquid. The $O_3$ is typically produced by pumping at least one of pure $O_2$ and ambient air (containing about 21% $O_2$ and 79% $N_2$) through an ozone generator system that utilizes a special electric field under which $O_2$ is converted into $O_3$, which is then fed into the biochar ozone treatment reactor. The particular $O_3$ generating and feeding conditions depend on several factors including the type of ozone generators, gas composition, power source capability and characteristics, operating pressure and temperature, the degree of ozonization required, and characteristics of the particular biochar being treated, i.e., its susceptibility or resistance to oxygenation. Depending on several factors including those mentioned above, the biochar can be exposed to the ozone treatment for at least about 0.1, 0.2, 0.5, 1, 1.5, 2, 2.5, 3, 4, or 5 minutes and up to 6, 8, 10, 12, 15, 20, 30, 40, 50, 60, 90 or 180 minutes. Although the biochar can be ozone treated within a temperature range of about 15° C. to about 30° C., a lower temperature, e.g., less than 15° C., or a higher temperature, e.g., greater than about 30° C., such as 40° C., 50° C., 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., and 300° C., 350° C., 400° C., or a range bounded by any two of the foregoing values, may also be used under controlled conditions where the possibility of combustion is adequately suppressed in the presence of at least one of $CO_2$, water and steam with limited availability of $O_2/O_3$.

As shown in FIG. 7, extremely hot biochar can be loaded into the biochar ozonization treatment reactor system 500 that employs a double-wall coolant-jacketed ozone gas biochar reactor system to enable cooling of hot biochar by use of a coolant and outputting hot coolant for the waste heat energy recovery and utilization such as the utilization of waste heat through a heat exchange system to preheat or to dry biomass. This system also takes advantage of an inverted-V-conical-shaped porous metal plate 504 that facilitates cooling of the biochar materials within the double-wall coolant-jacketed reactor. It utilizes controlled $O_3$ concentration levels under a $CO_2$ (and/or $N_2$) atmosphere to prevent possible biochar combustion especially during the loading of hot biochars from a biomass pyrolysis or gasification reactor. Therefore, this biochar ozonization system 500 (FIG. 7) may be integrated with an existing biomass pyrolysis or gasification reactor to produce advanced hydrophilic biochar products.

According to one of the various embodiments, after extremely hot biochar is loaded into the biochar ozonization treatment reactor system 500 (FIG. 7) and before starting the ozonization process, the hot biochar is cooled down to a temperature below about 120° C. in the double-wall coolant-jacketed reactor system to recover the heat from hot biochar to generate hot coolant output for waste heat utilization through a heat exchange system to dry biomass and/or biochar products. This operational feature results in not only better energy efficiency through utilization of biochar waste heat but also lowering the potential biochar fire risks when in contact with the ozone-containing gas treatment stream.

According to one embodiment, the biochar ozonization treatment reactor process is operated at a pressure selected from the group consisting of ambient pressure, 0.1 atm, 0.2, 0.5, 1, 1.5, 2, 3, 4, 5, 6, 7, 8, 10, 15, 20, 25, 30, 50 or 100 atm or a range bounded by any two of the foregoing values.

Not wishing to be bound by theory, the organic contaminants, i.e., potential toxins, adsorbed on biochar surfaces are removed by oxygenation chemical reactions with highly reactive $O_3$. At the same time, certain $O_3$-enabled oxygenation chemical reactions promote surface carboxylation and sometimes hydroxylation (possibly forming carboxyl COOH groups and hydroxyl OH on the biochar carbon surfaces), which increases surface wettability and cation exchange capacity (CEC). Both the surface wettability and CEC are important properties for biochar soil applications to better retain water and nutrients for improved soil fertility as well as reduction of agricultural chemical runoff In one embodiment, ozone is reacted with biochar in a closed system, i.e., a closed container, to ensure that the intended amount of ozonization reactants as measured, and no less and no more, is reacted with the biochar. When a ozonizing gas or liquid (or a solution thereof) is used, a selected volume of the gas or liquid corresponding to a calculated weight or moles of the ozone can be charged into the closed container (reactor) along with the biochar source and the contents homogeneously mixed or blended under conditions suitable for ozonization of the biochar to take place. For example, the temperature of the mixed reactants in the container can be controlled along with proper agitation until the ozone gas or liquid flows and diffuses fully through the biochar materials to promote its reaction with the biochar in a uniform, i.e., homogeneous, manner.

In one embodiment, the moisture level in the ozone treatment reactor can be suitably adjusted, for example, to a humidity level of about, at least, or no more than 1%, 2%, 5%, 10%, 15, 20%, 25%, 30%, 35%, 40%, 45%, 50%, 55%, 60%, 65%, 70%, 75%, 80%, 85%, 90%, 95%, or 100%, or a humidity level within a range bounded by any two of these values.

In another embodiment, ozonization/carboxylation of biochar materials is attained by conducting the ozonization/carboxylation reactions in an open or closed container and by rapidly quenching hot biochar with $O_3/CO_2$-containing water (FIG. 7). The extremely hot and reacting biochar from a biomass pyrolysis or gasification reactor can be quenched by, for example, contacting the reacting biochar with an excessive amount of $O_3/CO_2$-containing water such as $O_3/CO_2$/carbonated water, and/or an inert substance, preferably when the biochar material is still hot, e.g., at a temperature of at least about 800° C., 750° C., 700° C., 650° C., 600° C., 550° C., 500° C., 450° C., 400° C., 350° C., 300° C., 250° C., 200° C., 150° C., 100° C., 50° C., or within a range bounded by any two of these values, as produced from a biomass-to-biochar process. The inert substance can be, for example, carbonates, bicarbonate or a form of biomass (e.g., soil, plant-material, or the like). An excessive amount of $O_3/CO_2$/carbonated water, $O_3$/water liquid, $O_3$/water liquid-peroxide ($H_2O_2$), $O_3$/carbonated water liquid, $O_3$/carbonated water liquid-peroxide ($H_2O_2$), and/or $O_3$/carbonates/inert substance is an amount that preferably covers all of the reacting biochar, or alternatively, functions as a bulk surface shield of the biochar, with the result that the ozonization/carboxylation process is facilitated due to the addition of the excess $O_3/CO_2$ to the hot biochar preferably at a pressure higher than the ambient atmospheric pressure in the reactor as shown in FIG. 7. If an elevated temperature is being used in the ozonization/carboxylation process, the quenching step also has the effect of rapidly reducing the temperature of the biochar.

The methods described herein can also include one or more preliminary steps for producing biochar, i.e., the biochar source or "produced biochar", from biomass before the biochar is oxygenated/carboxylated. The biomass-to-biochar process can be conducted within any suitable time frame before the produced biochar is oxygenated/carboxylated.

In one embodiment, a biomass-to-biochar process is conducted in a non-integrated manner with the biochar ozonization process as shown, for example, in FIG. 6. In the non-integrated process, biochar produced by a biomass-to-biochar process is transported to a separate location where the biochar ozonization process is conducted. The transport process generally results in the cooling of the biochar to ambient temperature conditions, e.g., 15-40° C., before ozonization occurs. Typically, the produced biochar is packaged and/or stored in the non-integrated process before ozonization of the biochar.

In another embodiment, a biomass-to-biochar process is conducted in an integrated manner with a biochar ozonization process. In the integrated process, biochar produced by a biomass-to-biochar process is treated in situ using the double-wall coolant-jacketed ozone gas biochar reactor system 500 (FIG. 7) when the biochar is still very hot. For example, in the integrated embodiment, freshly produced biochar can have a temperature of, for example, about or at least 700° C., 650° C., 600° C., 550° C., 500° C., 450° C., 450° C., 400° C., 350° C., 300° C., 250° C., 200° C., 150° C., 100° C., or 50° C., or a temperature within a range bounded by any two of these values, before being subjected to the ozonization/carboxylation process. If desired, the freshly produced biochar can be subjected to additional cooling and/or heating to adjust and/or maintain its temperature before the ozonization step.

The biochar ozonization process can be integrated with, for example, a biomass-to-fuel process, such as a low temperature or high temperature pyrolysis/gasification process. In such processes, typically about 40%, 50%, or 60% of the biomass carbon is converted into biochar while the remaining 60%, 50%, or 40% of carbon is converted to fuel (syngas and bio-oils). Furthermore, since it has been found that lower temperature pyrolysis processes generally yield a biochar material with even more improved fertilizer retention properties, in one embodiment, the biochar ozonization process is integrated with a biomass pyrolysis/gasification process conducted at a temperature of about 800° C., 750° C., 700° C., 650° C., 600° C., 550° C., 500° C., 450° C., 400° C., 350° C., or 300° C. or a temperature within a range bounded by any two of these values.

According to one of the various embodiments, the biochar ozonization process is integrated with a biomass pyrolysis process operated at a temperature of about 500° C. to produce a clean hydrophilic biochar product with higher CEC value and minimized potential biochar toxins. Biochar produced from biomass pyrolysis process at around 500° C. is typically already quite clean (with minimized potential biochar toxins); however, its CEC value is often very low due to the loss of its carboxyl groups at such a high pyrolysis temperature (500° C.). In this case, the use of the biochar ozonization process enables creation of oxygen-containing functional groups on biochar surfaces at ambient temperature under ambient pressure, resulting in a better hydrophilic biochar product with higher CEC value and minimized potential toxins.

In one embodiment, an integrated process is configured as a batch process wherein separate batches of produced biochar are ozonized at different times. In another embodiment, the integrated process is configured as a continuous process wherein biochar produced by the biomass-to-biochar process is continuously subjected to an ozonization process as it is produced. For example, produced biochar can be continuously transported either manually or by an automated conveyor mechanism through a biochar ozonization zone. The automated conveyor mechanism can be, for example, a conveyor belt, a gravity-fed mechanism, or an air pressure mechanism.

In another aspect, the ozonized biochar produced herein has a particular, exceptional, or optimal set of characteristics, such as a particular, exceptional, or optimal cation exchange capacity, optimal pH value, optimal carboxyl content, optimal hydrophilicity and wettability, optimal water-holding field capacity, optimal oxygen-to-carbon molar ratio, surface area, nutrient contents, biochar particle size, composition, zero toxin content, and/or uniformity in any of these or other characteristics. The methods described herein are particularly suitable for producing these types of advanced hydrophilic biochars.

According to one of the various embodiments, the biochar ozonization treatment process has a feature that significantly increases the CEC value of biochars often by more than a factor of 2. For example, the biochar ozonization treatment can improve the CEC value of a biochar from its initial value of 80 mmol/kg to as high as 230 mmol/kg after an ozone treatment.

In one embodiment, the CEC of the ozonized biochar is at least moderate, e.g., about or at least 100, 110, 120, 130, 140, 150, 160, 170, 180, 190, 200, 210, 220, 230, 240 mmol/kg, or within a particular range bounded by any two of the foregoing values. In another embodiment, the CEC of the ozonized biochar is atypically or exceptionally high, e.g., about or at least 250, 300, 350, 400, 450, 500, 550, 600, 650, 700, 750, 800, 850, 900, 950, 1000, 1100, 1200, 1300, 1400, 1500 mmol/kg, or within a particular range bounded by any two of the foregoing values. In another embodiment, the CEC of the ozonized biochar is within a range having a minimum value selected from any of the exemplary moderate CEC values given above and a maximum value selected from any of the exemplary atypically high CEC values given above (for example, 100-1000 mmol/kg or 200-1200 mmol/kg). Preferably, the CEC value is substantially uniform throughout the biochar material.

The density of carboxy-containing cation-exchanging groups is typically proportional to the measured oxygen-to-carbon molar ratio of the biochar, wherein the higher the oxygen-to-carbon molar ratio, the greater the density of cation-exchanging groups in the biochar. In different embodiments, the oxygen-to-carbon molar ratio of the ozonized biochar is at least 0.1:1, 0.15:1, 0.2:1, 0.25:1, 0.3:1, 0.35:1, 0.4:1, 0.45:1, 0.50:1, 0.60:1, 0.70:1, or within a range bounded by any two of the foregoing ratios. Preferably, the ozonized biochar contains a substantially uniform density of the carboxy-containing cation-exchanging groups and a substantially uniform oxygen-to-carbon molar ratio throughout the biochar material.

According to another embodiment, the ozone-enabled molecular implantation of oxygen atoms into biochar carbon materials can be used also as a mechanism to remove potential biochar toxins through molecular structural destruction by the ozone-assisted implantation of oxygen atoms into the toxic organic molecules such as phenolic-type phytotoxins and polycyclic aromatic hydrocarbons (PAHs). Therefore, the destruction of potential biochar toxins, the enhancement of biochar cation exchange capacity and hydrophilicity, and the optimization of biochar pH are accomplished simultaneously through the ozone-enabled oxygenation into both the potential toxin molecules and biochar surfaces.

The ozonized biochar can have any suitable specific surface area (SSA), as commonly determined by BET analysis. In different embodiments, the ozonized biochar has an SSA value of about, or at least, or no more than 0.1, 0.5, 1, 2, 3, 4, 5, 10, 15, 20, 25, 30, 35, 40, 45, 50, 55, 60, 65, 80, 100, 200, 400, 600, or 800 m$^2$/g, or an SSA value within a range bounded by any two of the foregoing values.

The ozonized biochar can also have any suitable charge density. In different embodiments, the ozonized biochar has a surface charge density of about, or at least, or no more than 1, 2, 3, 4, 5, 10, 15, 20, 25, 30, 35, 40, 45, 50, 55, 60, 65, 70, 75, 80, 85, 90, 95, 100, 110, or 120 mmol/m$^2$, or a charge density within a range bounded by any two of the foregoing values.

According to one of the various embodiments, use of a biochar ozonization process can achieve biochar-surface oxygenation to significantly functionalize biochar surface properties such as its cation exchange value and pH without significantly affecting some of the biochar bulk properties such as the biochar core carbon stability and elemental compositions. This feature is explained by the understanding that the biochar surface atomic layer that is accessible to ozone represents only a very small fraction of the total biochar mass. Therefore, a significant biochar-surface oxygenation by ozonization may not significantly alter the bulk properties of the biochar core carbon materials, which is desirable in maintaining biochar carbon stability for biochar soil amendment and carbon sequestration applications.

According to one of the various embodiments, the ozonized biochar can also have any suitable carbon, nitrogen, oxygen, hydrogen, phosphorous, calcium, sulfur, ash, and volatile matter content. The carbon content can be about, at least, or no more than, for example, 20, 25, 30, 35, 40, 45, 50, 55, 60, 65, 70, 75, 80, 85, 90, or 95 mole percent, or within a particular range therein. The nitrogen content can be about, at least, or no more than, for example, 0.1, 0.25, 0.5, 0.75, 1.0, 1.25, 1.5, 1.75, 2.0, 2.25, 2.5, 2.75, 3.0, 3.25, 3.5, 3.75, 4.0, 4.5, 5.0, 6.0, 7.0, or 8.0 mole percent, or within a particular range therein. The oxygen content can be about, at least, or no more than, for example, 1, 2, 5, 10, 15, 20, 25, or 30 mole percent, or within a particular range therein. The hydrogen content can be about, at least, or no more than, for example, 1, 2, 5, 10, 15, 20, 25, or 30 mole percent, or within a particular range therein. The phosphorus or calcium content can independently be about, at least, or no more than, for example, 5, 10, 25, 50, 100, 500, 1000, 5000, 7500, 10000, 15000, 20000, or 25000 mg/kg, or within a particular range therein. The sulfur content can be about, at least, or no more than, for example, 50, 100, 200, 300, 400, 500, 600, 700, 800, 900, 1000, 1500, or 2000 ppm, or within a particular range therein. The ash content can be about, at least, or no more than, for example, 1, 2.5, 5, 10, 15, 20, 30, 40, 50, 60, or 70%, or within a particular range therein. The volatile matter content can be about, at least, or no more than, for example, 1, 2.5, 5, 10, 15, 20, 25, 30, 35, or 40%, or within a particular range therein.

The ozonized biochar can also have any suitable particle size. In various embodiments, the ozonized biochar can have a particle size of about, at least, or no more than, for example, 50, 100, 250, 500, 750, 1000, 1500, 2000, 2500, 3000, 3500, 4000, 4500, or 5000 µm, or a particle size within a particular range bounded by any two of the foregoing values. In certain applications, e.g., to ensure the biochar materials are resistant to becoming airborne in windy and/or arid regions, larger biochar particle sizes, such as 6000, 7000, 8000, 9000, 10,000, 20,000, 30,000, 40,000, 50,000 µm, or higher (for example, up to 100,000 µm), or a particle size within a particular range bounded by any two of the foregoing values, may be preferred. The biochar materials may also be in the form of an agglomeration, compaction, or fusion of biochar particles, e.g., pellets or cakes, for this type of application as well. The size of the pellets or cakes can correspond, for example, to any of the larger particle sizes given above.

The term "particle size" as used above for a particular value can mean a precise or substantially monodisperse particle size, e.g., within ±0-5% of the value, or a more dispersed particle size, e.g., greater than 5% and up to, for example, about 50% or 100% of the value. In addition, the biochar particles may have a size distribution that is monomodal, bimodal, or higher modal. The term "particle size" may also refer to an average particle size. If desired, the particle size of the ozonized biochar can be appropriately modified by techniques known in the art. For example, the biochar particles may be ground, agglomerated, or sieved by any of the techniques known in the art. Furthermore, when the particles or pellets are substantially or completely spherical, the above exemplary particle or pellet sizes refer to the diameter of the particles or pellets. For particles or pellets that are non-spherical, e.g., elliptical, cylindrical, rod-like, plate-like, disc-like, rectangular, pyramidal, or amorphous, the above exemplary particle or pellet sizes can refer to at least one, two, or three of the dimensional axes of the particles or pellets.

The ozonized biochar can also have any suitable pore size. In various embodiments, the ozonized biochar can have a pore size of about, at least, or no more than, for example, 0.5, 1, 1.5, 2, 2.5, 3, 3.5, 4, 4.5, 5, 6, 7, 8, 9, 10, 20, 30, 40, 50, 100, 250, 500, 750, 1000, 1500, 2000, 2500, 5000, 6000, 7000, 8000, 9000, 10,000, 20,000, 30,000, 40,000, 50,000, 60,000, 70,000, 80,000, 90,000 or 100,000 nm, or a pore size within a particular range bounded by any two of the foregoing values.

The ozonized biochar can also have any suitable pH value. Some of the conventional biochar materials, for example, those made from high-temperature pyrolysis or gasification processes, typically have an alkaline pH ranged from about pH 8.5 up to about pH 12, which are not ideal for use in many regions such as those in the western regions of the United States where the soil pH is already above pH 8.0. According to one of the various embodiments, use of the ozonization treatment can reduce the pH value of biochar through the formation of acidic carboxyl groups at biochar surfaces and/or by the formation and adsorption of nitrogen oxides/nitric acid during a biochar ozonization process in the presence of $N_2$. In various embodiments, depending on biochar ash contents, the ozonized biochar can have an optimized pH value of about, at least, or no more than, for example, 4, 4.5, 5, 6, 7, 8, 9, 10, 11, or a pH value within a particular range bounded by any two of the foregoing values.

The ozonized biochar, such as produced by the method described above, may also be admixed, i.e., enriched, with one or more soil-fertilizing compounds or materials for use as a fertilizing biochar soil amendment or additive and carbon sequestration agent. The soil-fertilizing compounds or materials can be, for example, nitrogen-based, e.g., ammonium-based, carbonate-based, e.g., $CaCO_3$, phosphate-based, e.g., the known phosphate minerals, such as in rock phosphate or triple superphosphate, and potassium-based, e.g., KCl. In one embodiment, the one or more soil-fertilizing compounds or materials include at least one nitrogen-containing, for example, $NH_4^+$-containing, compound or material. Some examples of nitrogen-containing fertilizing compounds or materials include, for example, $(NH_4)_2CO_3$, $NH_4HCO_3$, $NH_4NO_3$, $(NH_4)_2SO_4$, $(NH_2)_2CO$, biuret, triazine-based materials, e.g., melamine or cyanuric acid, urea-formaldehyde resin, and polyamine or polyimine polymers. The fertilizer material may be inorganic, as above, or alternatively, organic. Some examples of organic fertilizer materials include peat moss, manure, insect material, seaweed, sewage, and guano. The biochar material can be treated by any of the methods known in the art in order to combine the biochar material with a fertilizer. In a particular embodiment, the biochar material is treated with a gas stream of hydrated ammonia to saturate the biochar material. The biochar material may also be coated with fertilizer compounds or materials. The coating may also be suitably modified or optimized as known in the art to adjust the rate of release of one or more fertilizer compounds or materials into soil. In another embodiment, one or more of the above generic or specific soil-fertilizing compounds or materials are excluded from the ozonized biochar composition.

In another embodiment, the invention is directed to a soil formulation containing, at a minimum, soil admixed with the biochar composition described above. The soil can be of any type and composition. For example, the soil can have any of the numerous and diverse proportions of clay, sand, and silt. The sand, silt, and clay components can be independently present in an amount ranging from substantially absent, i.e., zero weight percent or in trace amounts, up to about 100 weight percent, e.g., exactly 100% or at least 98 or 99%. In different embodiments, one or more of the sand, silt, and clay components are in an amount of, independently, about, at least, or no more than, for example, 0.1, 0.5, 1, 2, 5, 10, 15, 20, 25, 30, 35, 40, 45, 50, 55, 60, 65, 70, 75, 80, 85, 90, or 95 weight percent of the total weight of the soil absent the biochar. The soil may also preferably have one or more of the sand, silt, and clay components present in an amount within a range bounded by any two of the foregoing exemplary weight percentages. The soil can also contain any amount of humus and humic substances, i.e., organic matter, humic acid, fulvic acid, cellulose, lignin, peat, or other such component, in any of the exemplary amounts or ranges given above.

According to another embodiment, an ozonized biochar can remove certain industrial organic molecules such as methylene blue dye 5 times better than the untreated biochar.

According to one of the various embodiments, the ozonized biochar can be used as filtration materials to remove various cations and pollutants from fluid streams including water and air. This embodiment is also directed to the use of certain ozonized biochar materials for other environmental or industrial applications such as the formulation and production of ozonized biochar columns or filters for filtration of fluids, including, for example, water, air and other solvents. During the filtration process, various cations and/or pollutants in the medium such as water and air will be in contact with the ozonized biochars in the columns and filters thereby are removed through cation exchange binding and/or physical chemistry adsorption on the ozonized biochar materials. In many cases, the used biochar columns and filters can be readily disposed by combustion cleanly back to air $CO_2$ and $H_2O$. For certain biochar columns and filters after used in removal of certain heavy metal ions such as, for example, $Cu^{2+}$, they can also be combusted to retain their adsorbed heavy metal content in a relatively small amount of the resultant ash that can also be readily disposed by other proper ways as well. In other aspects, the biochar materials may be disposed by burying into soil at certain proper locations consistent with the practices of both waste disposal and biochar carbon sequestration. Since the biomass-derived and ozonized biochar materials are completely renewable, the use of ozonized biochar materials for filtration applications disclosed herein is another sustainable green-clean technology to remove various cations and pollutants in waters and air. Accordingly, ozonized biochar columns and filters may be used to remove various cations, contaminants, and pollutants selected from the group consisting of ammonium ($NH_4^+$), $Li^+$, $Ba^{2+}$, $Fe^{2+}$, $Fe^{3+}$, $Cu^+$, $Cu^{2+}$, $Cd^{2+}$, $Cs^+$, $Sr^{2+}$, $Ni^{2+}$, $Zn^{2+}$, $Cr^{3+}$, $Pb^{2+}$, $Hg^{2+}$, other metal ions including uranium ions, plutonium ions, osmium ions, platinum ions, gold ions, iridium ions, ruthenium ions, rhodium ions, cobalt ions, titanium ions, thallium ions, tin ions, indium ions, gallium ions, germanium species and germanium compounds, arsenic species and arsenic compounds, selenium species and selenium compounds, and organic and/or inorganic molecules including certain pollutants in waters, air and other environmental and industrial media as well.

EXAMPLES

The following examples illustrate methods and systems for making biochar in accordance with exemplary embodiments of the present invention and also provide an analysis of improved properties of the resulting biochar. These examples are purely exemplary and are not intended to limit the scope of the present invention. Efforts have been made to ensure accuracy with respect to numbers (e.g., amounts, temperatures, etc.), but some errors and deviations should be accounted for. Unless indicated otherwise, parts are parts by weight, temperature is in ° C. or is at ambient temperature, and pressure is at or near atmospheric, or in atmospheric pressure units (atm).

Example 1

Ozone Treatment Reducing Biochar pH

Table 1 shows the changed in pH of the biochar samples brought about by treatment with ozone. Overall there is a dramatic decrease in the pH of the biochar samples from untreated at 7.30±0.39 to the sample treated with 90 minutes of ozone at 5.28±0.33. This sharp decrease in pH results from, for example, the addition of acidic functional groups, primarily carboxyl groups on the surface of the biochar. The trend of the drop in pH illustrates a relationship between treatment time and increasing acidity of the biochar samples. This drop in pH is an important characteristic when considering using biochar as a soil amendment. Therefore, exemplary embodiments for ozone treatment of biochar can be used to adjust or to "tune" biochar pH to a desired value for a given soil.

TABLE 1

Summary data for pH, CEC, and Methylene blue adsorption.

| Sample | pH | CEC mmol/kg | Methylene Blue Adsorption mg/g |
|---|---|---|---|
| Untreated | 7.30 ± 0.39 | 153.9 ± 15.9 | 1.79 ± 0.18 |
| 30 Min $O_3$ | 5.46 ± 0.40 | 302.6 ± 32.3 | 9.22 ± 0.18 |
| 60 Min $O_3$ | 5.33 ± 0.28 | 310.3 ± 24.4 | 9.45 ± 0.07 |
| 90 Min $O_3$ | 5.28 ± 0.33 | 326.9 ± 25.1 | 9.35 ± 0.04 |
| Ref. Soil | N/A | 131.8 ± 9.6 | N/A |

Example 2

Ozone Treatment Enhancing Biochar Cation Exchange Capacity by a Factor of More than 2 Times Table 1 also illustrates a significant increase in the measured CEC values of biochar processed in accordance with exemplary embodiments of the ozone treatment. The untreated biochar sample had a CEC of 153.9±15.9, and the sample treated with 90 minutes of ozone had a value of 326.9±25.1 (in units of mmol/kg biochar). In the illustrated example, there is only a small difference between the 30, 60, and 90 minute ozone treated samples, which is potentially due to a saturation of the sites available for alteration by ozone treatment. The increase in CEC is due to an increase in oxygen functionality, as discussed, for example, in Lee et al., Environ. Sci. Technol. 44:7970-7974 (2010) and Matthew et al., Journal of Environmental Management, 146: 303-308(2014). Specifically, cation exchange capacity correlates to the availably of oxygen function groups, predominately carboxylic acid groups which carry a negative charge in basic and neutral solutions, making them electrostatically attracted to cations. Table 1 also lists the CEC value of a reference soil sample of 131.8±9.6. From this, it is clear that even untreated biochar has a higher CEC, and treated samples more than double the native CEC of the reference soil sample.

Example 3

Ozone Treatment Improving Biochar Methylene Blue Adsorption Capability by a Factor of More than 5 Times Methylene blue adsorption capacity was measured to evaluate the viability of the biochar for dye-contaminant removal in water systems. As shown in Table 1, there is a dramatic increase in methylene blue removal capacity resulting from ozone treatment, with the untreated biochar sample only removing 1.79±0.18 mg dye/kg biochar while the 90 minute ozone treated sample removed 9.35±0.04. This significant increase shows the usefulness of ozone treatment when considering biochar amendment for use in contaminated water systems. It is believed that the increase in methylene blue adsorption capacity results from the increase of oxygen functionality on the surface of the biochar, which makes the biochar overall more negatively charged. Methylene blue is natively positive in solution, and therefore is more electrostatically attracted to biochar that has been treated with ozone.

Example 4

Elemental Analysis Measurement Showing Biochar Bulk Properties Such as Elemental Composition not Significantly Altered by Ozonization Elemental analysis measures the bulk composition of the biochar and is useful in determining the degree of change brought about by ozone treatments. Overall, there is not a dramatic change through the use of ozone treatments as shown in Table 2, However, there is a clear drop in carbon content from the untreated sample (73.90%±0.06) and the 30 minute ozone treated sample (66.76%±2.77). Additionally, there appears to be an increase in oxygen content of the biochar samples as measured by the difference from the untreated (22.78%) to the 30 minute ozone treated sample (30.07). This data correlates well with the concurrent drop in pH of these samples, as well as the increase in CEC, both owing the change in their properties due to an increase in oxygen functionality. The drop in carbon content across all samples also reveals that ozone treatments selectively attack the carbon bonds in the biochar, which is also shown in the FTIR-ATR data in FIG. 9. It should be noted that there is not a great change between the untreated and the 90 minute treated sample in terms of carbon content, owing to the inherent stability of the biochar itself.

TABLE 2

Elemental analysis of treated and untreated biochar samples by percentage of C, H, and N

| Treatment Type | % C | % H | % N | Balance |
|---|---|---|---|---|
| Untreated | 73.90 ± 0.06 | 3.32 ± 0.06 | <0.5 | 22.78 |
| 30 Min $O_3$ | 66.76 ± 2.77 | 3.17 ± 0.45 | <0.5 | 30.07 |
| 60 Min $O_3$ | 71.70 ± 0.27 | 3.35 ± 0.07 | <0.5 | 24.95 |
| 90 Min $O_3$ | 71.31 ± 0.30 | 3.34 ± 0.04 | <0.5 | 25.35 |

Example 5

Application of Hydrogen Peroxide Treatment for Biochar-Surface Oxygenation

In this example, biochar was produced from pinewood biomass by pyrolysis at a highest treatment temperature (HTT) of 400° C. This biochar was then treated with varying concentrations of a $H_2O_2$ solution (1, 3, 10, 20, 30% w/w) for a partial oxygenation study. The biochar samples, both treated and untreated, were then tested with a cation exchange capacity (CEC) assay, Fourier Transformed Infrared Resonance (FT-IR), elemental analysis, field water-retention capacity assay, pH assay, and analyzed for their capacity to remove methylene blue from solution. As shown in Table 3, the results demonstrate that higher $H_2O_2$ concentration treatments led to higher CEC due to the addition of acidic oxygen functional groups on the surface of the biochar, which also corresponds to the resultant lowering of the pH of the biochar with respect to the $H_2O_2$ treatment. Furthermore, it shows that the biochar methylene blue adsorption decreased with higher $H_2O_2$ concentration treatments. This is believed to be due to the addition of oxygen groups onto the aromatic ring structure of the biochar which in turn weakens the overall dispersive forces of π-π interactions that are mainly responsible for the adsorption of the dye onto the surface of the biochar. As shown in Table 4, the elemental analysis revealed that there was no general augmentation of the elemental composition of the biochar samples through the treatment with $H_2O_2$, which suggests that the bulk property of biochar remains unchanged through the treatment.

TABLE 3

Assay results of $H_2O_2$-treated and untreated biochar samples for CEC (cmol/Kg biochar), Field Capacity (grams water retained per gram biochar), pH, and Methylene blue adsorption (mg dye adsorbed per gram biochar).

| Treatment (% $H_2O_2$) | CEC (cmol/Kg biochar) | Field Capacity (g $H_2O$/g biochar) | pH | Methylene Blue Adsorption (mg/g) |
|---|---|---|---|---|
| 0 (Untreated) | 17.95 ± 3.53 | 4.69 ± 0.09 | 7.16 ± 0.04 | 7.14 ± 0.28 |
| 1 | 23.75 ± 5.12 | 4.77 ± 0.44 | 7.14 ± 0.02 | 7.71 ± 0.33 |
| 3 | 23.30 ± 5.09 | 4.33 ± 0.76 | 7.05 ± 0.01 | 7.41 ± 0.38 |
| 10 | 25.58 ± 5.40 | 4.24 ± 0.57 | 6.70 ± 0.06 | 6.56 ± 0.34 |
| 20 | 25.43 ± 4.13 | 4.62 ± 0.45 | 6.34 ± 0.04 | 6.57 ± 0.07 |
| 30 | 31.37 ± 6.17 | 4.76 ± 0.35 | 5.66 ± 0.03 | 5.50 ± 0.37 |

TABLE 4

Elemental analysis of $H_2O_2$-treated and untreated biochar samples by percentage of C, H, N and balance by mass.

| Treatment (% $H_2O_2$) | C (wt %) | H (wt %) | N (wt %) | Balance (wt %) |
|---|---|---|---|---|
| 1 | 72.59 ± 1.62 | 3.63 ± 0.17 | <0.5 | 23.78 |
| 3 | 71.38 ± 1.22 | 3.61 ± 0.04 | <0.5 | 25.01 |
| 10 | 68.73 ± 1.16 | 3.32 ± 0.38 | <0.5 | 27.95 |
| 20 | 72.18 ± 0.43 | 3.83 ± 0.10 | <0.5 | 23.99 |
| 30 | 71.43 ± 1.70 | 3.94 ± 0.12 | <0.5 | 24.63 |
| 0 (Untreated) | 72.59 ± 0.17 | 3.86 ± 0.01 | <0.5 | 23.55 |

Example 6

Figure 9:
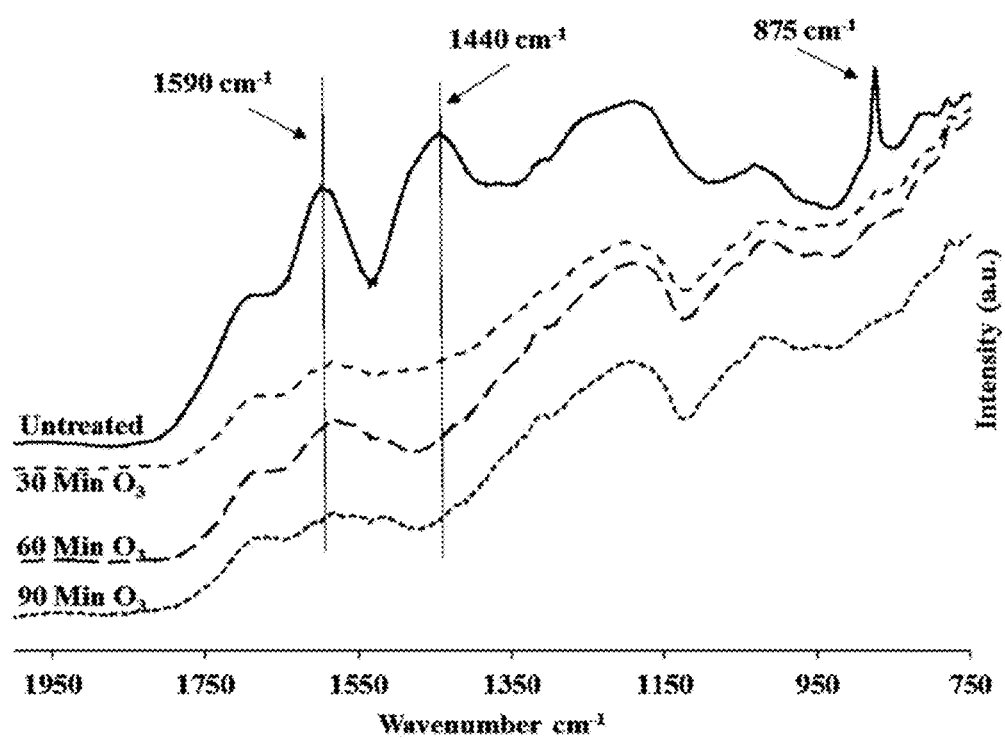
FIG. 9 is a graph illustrating Fourier Transformed Infrared-Attenuated Total Reflectance (FTIR-ATR) spectra of biochar samples treated with ozone for 30 min, 60 min and 90 min in comparison with that of untreated biochar.

Biochar FTIR-ATR Spectroscopy Showing Reaction of Ozone Selectively with Biochar C=C Double Bonds The FTIR-ATR spectra as shown in FIG. 9 reveals information about the functional group changes brought about by ozone treatment. Two peaks appearing at 1590 $cm^{-1}$ and 1440 $cm^{-1}$ correspond to elastic and inelastic stretching of carbon-carbon double bonds in an aromatic ring structure. These two peaks primarily appear only in the untreated sample, and are greatly reduced in the ozone treated samples, revealing that the ozone selectively reacts with the double bonded carbon throughout the biochar substrate. Furthermore, a peak at 875 $cm^{-1}$ on the untreated sample spectra corresponding to C—H out of plane stretching from an aromatic carbon ring is also greatly reduced with ozone treatment, showing further evidence of the reaction of ozone selectively with carbon-carbon double bonds.

Example 7

Biochar Raman Spectroscopy Showing Ozone-Enabled Biochar-Surface Oxygenation

Figure 10:
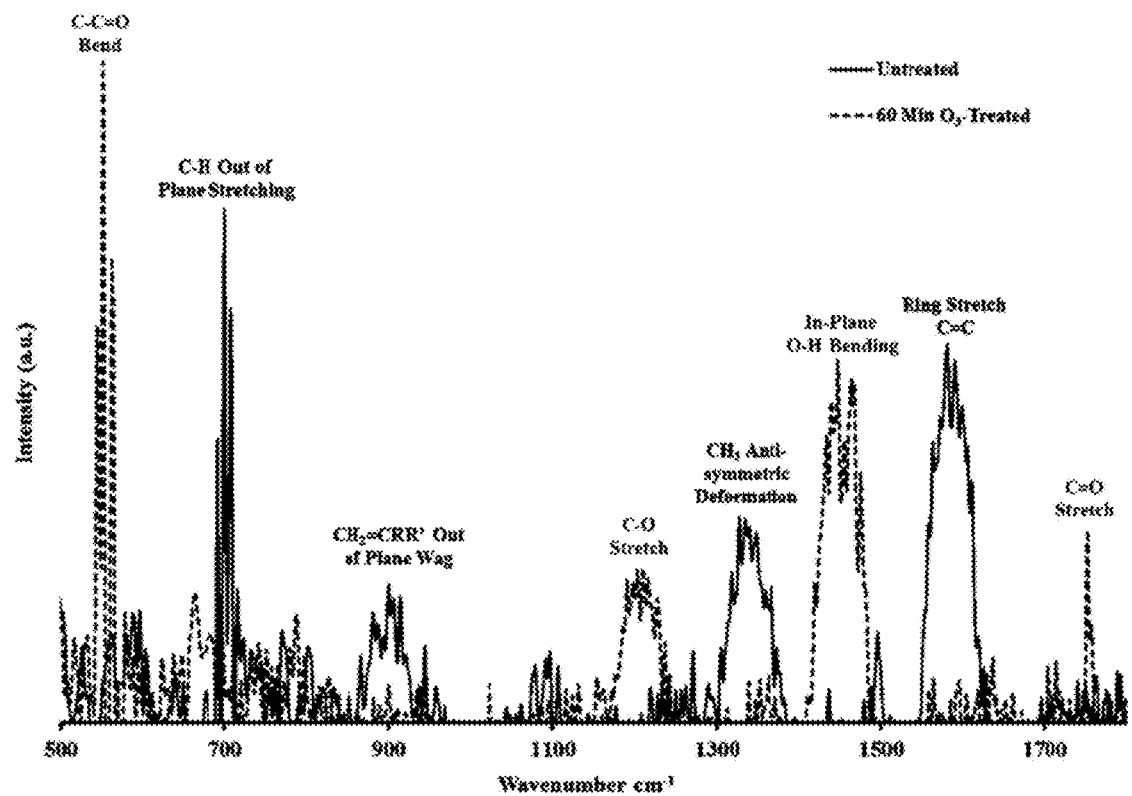
FIG. 10 is a graph illustrating Raman spectra of biochar samples treated with ozone for 60 min in comparison with that of untreated biochar.

The Raman spectra as shown in FIG. 10 reveals dramatic differences in functionality between biochar samples that have been treated with ozone versus the untreated sample. Primarily there is an apparent loss of peaks corresponding to aromatic ring stretching as well as alkene out of plane wag functionality (1600 $cm^{-1}$ and 900 $cm^{-1}$). Concurrently, as the peaks corresponding to double-bonded carbon functionality are decreased in the ozone treated samples, there is an increase in peaks corresponding to various oxygen functionality. The peaks appearing in the treated samples are consistent with C=O and C—O stretching as well as in plane O—H and C—C=O bending (1720 cm$^{-1}$, 1220 cm$^{-1}$, 1480 cm$^{-1}$, and 550 cm$^{-1}$, respectively). Overall this spectra provides further evidence of an intense change in functionality brought about by ozone treatment on the surface of the biochar, namely the conversion of aromatic double bonded carbon functionality to different oxygen containing groups.

While the present invention has been illustrated by description of several embodiments and while the illustrative embodiments have been described in considerable detail, it is not the intention of the applicant to restrict or in any way limit the scope of the invention claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of applicant's general inventive concept.

What is claimed is:

1. A method for industrial production of an ozonized biochar composition, the method comprising:
    reacting a biochar source with an ozone-containing gas stream in a biochar ozonization treatment reactor system using an ozone-enabled biochar-surface oxygenation operational process, wherein reacting the biochar source comprises:
       contacting the biochar source with the ozone-containing gas stream;
       enabling biochar-surface oxygenation;
       destroying an organic biochar toxin;
       producing an ozonized biochar composition having enhanced cation exchange capacity; and
       producing a special ozonized biochar composition having an enhanced filtration property through increased contaminant adsorption to the biochar to remove at least one contaminant from a medium selected from the group consisting of water and air.

2. The method of claim 1, wherein the biochar ozonization treatment reactor system comprises:
    a biochar ozonization reactor comprising a biochar ozonization reactor wall enclosing the biochar ozonization reactor, a top and a bottom opposite the top;
    an air inlet pump and valve;
    an ozone generator system in communication with the air inlet pump and valve;
    an ozone air inlet and tube in communication with the ozone generator system and passing through the biochar ozonization reactor wall adjacent the bottom;
    ozone air space within the biochar ozonization reactor adjacent the bottom;
    porous metal plate disposed within the biochar ozonization reactor in contact with the biochar ozonization reactor wall and extending over the ozone air space;
    a biochar ozonization reactor chamber space above the porous metal plate;
    a biochar inlet passing through the biochar ozonization reactor wall at the top;
    an ozonized biochar outlet passing through the biochar ozonization reactor wall adjacent the bottom;
    a tail gas vent valve and filter passing through the biochar ozonization reactor wall adjacent the top;
    a tail gas vent tube in communication with the biochar ozonization reactor wall at the top;
    a tail gas recycling filter and valve in communication with the tail gas vent tube;
    a flexible tail gas recycling tube in communication with the tail gas recycling filter and valve;
    a tail gas pump and valve in communication with the flexible tail gas recycling tube and the air inlet valve and pump to connect the tail gas vent tube to the air inlet;
    a heat-smoke-sensing sprinkler system passing through the biochar ozonization reactor wall at the top; and
    a flexible inlet and outlet valve in communication with the biochar ozonization reactor wall at the bottom.

3. The method of claim 1, wherein the biochar ozonization treatment reactor system comprises:
    a biochar ozonization reactor comprising a biochar ozonization reactor wall enclosing the biochar ozonization reactor, a top and a bottom opposite the top;
    an $O_3/CO_2$ air inlet pump and valve; and
    an ozone generator system in communication with the $O_3/CO_2$ air inlet pump and valve;
    an ozone air inlet and tube in communication with the ozone generator and passing through the biochar ozonization reactor wall adjacent the bottom;
    an $O_3/CO_2$ air space within the biochar ozonization reactor adjacent the bottom;
    a conical-shaped porous metal plate disposed within the biochar ozonization reactor in contact with the biochar ozonization reactor wall and extending over the $O_3/CO_2$ air space;
    a biochar ozonization reactor chamber space above the porous metal plate;
    a biochar inlet passing through the biochar ozonization reactor wall at the top;
    an $O_3/CO_2$ air flow from the $O_3/CO_2$ air space at the bottom through the conical-shaped porous metal plate and biochar materials disposed in the biochar ozonization reactor chamber space toward the top;
    an ozonized biochar outlet passing through the reactor wall adjacent the bottom;
    a tail gas vent tube valve and filter at the top of the biochar ozonization reactor;
    a flexible tail gas recycling tube in communication with the tail gas vent valve and filter;
    a tail gas pump and valve in communication with the flexible gas recycling tube and the $O_3/CO_2$ air inlet to connect the tail gas vent tube valve and filter to the $O_3/CO_2$ air inlet;
    a heat-smoke-sensing sprinkler system with water inlet and water spray system in communication with the biochar ozonization reactor wall at the top; and
    a flexible water inlet and outlet valve and optional water level at the bottom of the biochar ozonization reactor.

4. The method of claim 1, wherein the biochar ozonization treatment reactor system comprises:
    a biochar ozonization reactor comprising a biochar ozonization reactor wall enclosing the biochar ozonization reactor, a top and a bottom opposite the top;
    an $O_3/CO_2$ air inlet pump and valve;
    an ozone generator system in communication with the $O_3/CO_2$ air inlet pump and valve;
    an ozone air inlet and tube in communication with the ozone generator system and passing through the biochar ozonization reactor wall adjacent the bottom;
    an $O_3/CO_2$ air space within the biochar ozonization reactor adjacent the bottom;
    a W-conical-shaped porous metal plate disposed within the biochar ozonization reactor in contact with the biochar ozonization reactor wall and extending over the $O_3/CO_2$ air space;

a biochar ozonization reactor chamber space above the porous metal plate;

a biochar inlet passing through the biochar ozonization reactor wall at the top;

an $O_3/CO_2$ gas flowing from the $O_3/CO_2$ air space at the bottom through the W-conical-shaped porous metal plate and biochar materials disposed in the biochar ozonization reactor chamber space toward the top;

an ozonized biochar outlet passing through the reactor wall adjacent the bottom;

a tail gas vent tube valve and filter at the top of the biochar ozonization reactor;

a flexible tail gas recycling tube in communication with the tail gas vent valve and filter;

a tail gas pump and valve in communication with the flexible gas recycling tube and the $O_3/CO_2$ air inlet to connect the tail gas vent tube valve and filter to the $O_3/CO_2$ air inlet;

a heat-smoke-sensing sprinkler system with water inlet and water spray system in communication with the biochar ozonization reactor wall at the top; and a flexible water inlet and outlet valve at the bottom of the biochar ozonization reactor;

a recycling water pump in communication with the flexible water inlet and out valve;

a flexible water recycling tube connected to the recycling water pump and the water inlet of the heat-smoke-sensing sprinkler system.

5. The method of claim 1, wherein the biochar ozonization treatment reactor system comprises:

a biochar ozonization reactor comprising a biochar ozonization reactor wall enclosing the biochar ozonization reactor, a top and a bottom opposite the top;

an $O_3/CO_2$ air inlet pump and valve; and an ozone generator system in communication with the $O_3/CO_2$ air inlet pump and valve;

an ozone air inlet and tube in communication with the ozone generator and passing through the biochar ozonization reactor wall adjacent the bottom;

an $O_3/CO_2$ air space within the biochar ozonization reactor adjacent the bottom;

a V-conical-shaped porous metal plate disposed within the biochar ozonization reactor in contact with the biochar ozonization reactor wall and extending over the $O_3/CO_2$ air space;

a biochar ozonization reactor chamber space above the porous metal plate;

a biochar inlet passing through the biochar ozonization reactor wall at the top;

an $O_3/CO_2$ air flow from the $O_3/CO_2$ air space at the bottom through the V-conical-shaped porous metal plate and biochar materials disposed in the biochar ozonization reactor chamber space toward the top;

an ozonized biochar outlet passing through the reactor wall adjacent the bottom;

a tail gas vent tube valve and filter at the top of the biochar ozonization reactor;

a flexible tail gas recycling tube in communication with the tail gas vent valve and filter;

a tail gas pump and valve in communication with the flexible gas recycling tube and the $O_3/CO_2$ air inlet to connect the tail gas vent tube valve and filter to the $O_3/CO_2$ air inlet ;

a heat-smoke-sensing sprinkler system with water inlet and water spray system in communication with the biochar ozonization reactor wall at the top; and a flexible water inlet and outlet valve and optional water level at the bottom of the biochar ozonization reactor.

6. The method of claim 1, wherein the said biochar ozonization treatment reactor system comprises:

a biochar ozonization reactor comprising a double-wall coolant-jacketed ozone gas biochar reactor comprising a heat-conducting reactor inner wall, a reactor outer wall, a top and a bottom opposite the top;

a coolant chamber space formed between the reactor inner wall and the reactor outer wall;

a coolant inlet in communication with the coolant chamber space at the bottom;

a hot coolant outlet in communication with the coolant chamber space at the top;

an $O_3/CO_2$ air inlet pump and valve;

an ozone generator system in communication with the $O_3/CO_2$ air inlet pump and valve;

an ozone air inlet and tube in communication with the ozone generator system and passing through the reactor outer wall and the reactor inner wall adjacent the bottom;

an ozone $O_3/CO_2$ air space disposed in the biochar ozonization reactor at the bottom;

an inverted-V conical-shaped porous metal plate disposed in the biochar ozonization reactor and in communication with the reactor inner wall;

a biochar ozonization reactor chamber space above the porous metal plate;

a hot biochar inlet passing through the reactor inner wall and the reactor outer wall at the top;

an $O_3/CO_2$ gas flowing from the $O_3/CO_2$ air space through the V-conical-shaped porous metal plate and biochar materials disposed in the biochar ozonization reactor chamber space toward the top;

an ozonized biochar outlet passing through the reactor inner wall and the reactor outer wall at the bottom;

a tail gas vent valve and filter at in communication with the top of the biochar ozonization reactor;

a tail gas recycling filter and valve in communication with the tail gas vent valve and filter;

a flexible tail gas recycling tube in communication with the tail gas recycling filter and valve;

a tail gas recycling pump and valve in communication with the flexible gas recycling tube and the $O_3/CO_2$ air inlet pump and valve;

a heat-smoke-sensing sprinkler system comprising a water inlet and water spray system in communication with the top of the biochar ozonization reactor; and a water level and flexible water inlet and outlet valve at the bottom of the biochar ozonization reactor.

7. The method of claim 1, wherein the biochar ozonization treatment reactor system comprises ozone-compatible materials selected from the group consisting of stainless steel, titanium, silicone, glass, polytetrafluoroethylene, a perfluoroelastomer polymer, polyether ether ketone, polychlorotrifluoroethylene, chlorinated polyvinyl chloride, a silicon cast iron, chromium and molybdenum alloy, filled PTFE gasket material, a nickel, molybdenum, chromium and iron alloy, polycarbonate, polyurethane, polyvinylidene difluoride, butyl, a heat- and chemical-resistant ethylene acrylic elastomer, a synthetic rubber and fluoropolymer elastomer, ethylene-propylene, a thermoplastic vulcanizate, flexible polyethylene tubing, fluorosilicone, aluminum, copper, and combinations thereof.

8. The method of claim 1, wherein the ozone-enabled biochar-surface oxygenation operational process comprises a dry biochar ozonization treatment operational process comprising:
- loading biochar materials into a reactor through a biochar inlet;
- monitoring and adjusting a biochar temperature;
- monitoring and adjusting biochar water content and relative humidity in the reactor;
- pumping dry oxygen-containing source gas through an ozone generator system to generate ozone;
- feeding a dry ozone-containing gas stream into the reactor through a porous metal plate above an ozone air space by controlling an air pump fan speed without using any water;
- using a flexible inlet and outlet valve at a bottom of the reactor to introduce other gas component into the gas stream to manipulate the biochar ozonization process;
- using a flexible tail gas recycling tube with a filter and valve, and a pump and valve to re-use at least part of tail gas for the biochar ozonization process;
- allowing sufficient time for the ozone-containing gas stream to diffuse through and interact with biochar particles while controlling and monitoring treatment conditions;
- harvesting the ozonized biochar products through an ozonized biochar outlet using gravity.

9. The method of claim 1, wherein the ozone-enabled biochar-surface oxygenation operational process comprises a wet-moisture biochar ozonization treatment operational process comprises the following process steps that may be operated in combination with the use of hydrogen peroxide:
- loading biochar materials into a reactor through a biochar inlet;
- monitoring and adjusting a biochar temperature;
- monitoring biochar water content and relative humidity in the reactor;
- based on a required biochar water content and relative humidity, adding at least one of water, steam and vapor into the biochar materials using at least one of a heat-smoke-sensing sprinkler system with a water inlet and water spray system located at a top of the reactor and a flexible water inlet and outlet valve at a bottom of the reactor;
- pumping an oxygen-containing source gas stream through an ozone generator system to generate ozone;
- feeding ozone-containing gas stream into a reactor chamber space through a porous metal plate above an ozone air space by controlling an air pump fan speed;
- using a flexible inlet and outlet valve at the bottom of the reactor to introduce additional gas components into the treating gas stream to manipulate the biochar ozonization process;
- using a flexible tail gas recycling tube having a filter and valve and pump and valve to re-use at least part of tail gas;
- allowing sufficient time for the ozone-containing stream to diffuse through and interact with biochar particles while controlling and monitoring treatment conditions;
- discharging residual ozonized liquid at the bottom of the reactor through a flexible water inlet and outlet;
- harvesting the ozonized biochar products through an ozonized biochar outlet using gravity.

10. The method of claim 1, wherein the biochar source comprises a byproduct of at least one of a pyrolysis process and a gasification process, a material acquired from a biochar deposit, natural coal materials, biomass, or a combination thereof.

11. The method of claim 1, wherein the biochar source comprises a biomass comprising cornstover, switchgrass, miscanthus, wheat straw, rice straw, barley straw, alfalfa, bamboo, hemp, sugarcane, nut shell material, grain hull material, woodchips, saw dust, waste cardboard box, paper or wood pulp, algae, aquatic plants, food waste, spent mushroom substrate, chicken litters, heifer manure, cow manure, horse manure, pig manure, agricultural waste, forest waste, or a combination thereof.

12. The method of claim 1, wherein enabling biochar-surface oxygenation and destroying the potential biochar toxin are accomplished simultaneously using an $O_3$-containing gas stream flowing through a biochar ozonization treatment reactor at ambient pressure and temperature.

13. The method of claim 12, wherein enabling the biochar-surface oxygenation comprises using ozone reacting with the C═C double bonds of biochar materials forming carbonyl and carboxyl groups on biochar surfaces.

14. The method of claim 12, wherein destroying the potential biochar toxin comprises using ozone reacting with the C═C double bonds of the potential biochar toxin including phenolic-type and polycyclic aromatic hydrocarbons.

15. The method of claim 1, wherein the potential biochar toxin is selected from the group consisting of residual pyrolysis bio-oils, small organic molecules having a molecular mass of less than or equal to about 500 Dalton, polycyclic aromatic hydrocarbons, degraded lignin species rich in oxygen containing functionalities, phenolic type of phytotoxins with at least one carboxyl group, and any combination thereof.

16. The method of claim 1, wherein the ozonized biochar composition comprises a cation exchange capacity of at least 200 mmol/kg and is free of biochar toxins.

17. The method of claim 1, wherein the ozonized biochar composition is free of biochar toxins and comprises an optimized pH value in a range from about 4 to about 11.

18. The method of claim 17, wherein the optimized biochar pH value is obtained using formation of acidic carboxyl groups at biochar surfaces and by formation and adsorption of at least one of nitrogen oxides and nitric acid during a biochar ozonization process in the presence of $N_2$.

19. The method of claim 1, wherein the ozonized biochar composition comprises a cation exchange capacity of at least 200% of that of untreated biochar and is free of biochar toxins.

20. The method of claim 1, wherein the at least one contaminant is selected from the group consisting of a cation, an organic molecule, a methylene blue dye, and an inorganic pollutant.

* * * * *